(12) United States Patent
Hall et al.

(10) Patent No.: US 12,019,690 B1
(45) Date of Patent: Jun. 25, 2024

(54) SYSTEMS AND METHODS FOR CACHING STRUCTURAL ELEMENTS OF ELECTRONIC DOCUMENTS

(71) Applicant: Google LLC, Mountain View, CA (US)

(72) Inventors: Lindsay Grace Hall, Brooklyn, NY (US); Jeffrey de Blanc Palm, New York, NY (US); Victoria Hsiao-tsung Chou Fritz, Maplewood, NJ (US); Michael Owen Thomas, New York, NY (US)

(73) Assignee: Google LLC, Mountain View, CA (US)

( * ) Notice: Subject to any disclaimer, the term of this patent is extended or adjusted under 35 U.S.C. 154(b) by 18 days.

(21) Appl. No.: 17/521,794

(22) Filed: Nov. 8, 2021

Related U.S. Application Data

(63) Continuation of application No. 16/512,333, filed on Jul. 15, 2019, now Pat. No. 11,170,057, which is a continuation of application No. 14/703,811, filed on May 4, 2015, now Pat. No. 10,353,960.

(51) Int. Cl.
| | |
|---|---|
| *G06F 16/93* | (2019.01) |
| *G06F 16/22* | (2019.01) |
| *G06F 16/2455* | (2019.01) |
| *G06F 16/31* | (2019.01) |
| *G06F 16/951* | (2019.01) |
| *G06F 40/177* | (2020.01) |

(52) U.S. Cl.
CPC .......... *G06F 16/93* (2019.01); *G06F 16/2282* (2019.01); *G06F 16/24552* (2019.01); *G06F 16/24565* (2019.01); *G06F 16/316* (2019.01); *G06F 16/328* (2019.01); *G06F 16/951* (2019.01); *G06F 40/177* (2020.01)

(58) Field of Classification Search
CPC ................ G06F 16/93; G06F 16/2282; G06F 16/24552; G06F 16/24565; G06F 16/316; G06F 16/328; G06F 16/951; G06F 40/177
See application file for complete search history.

(56) References Cited

U.S. PATENT DOCUMENTS

| | | | |
|---|---|---|---|
| 7,596,747 B2 | 9/2009 | Spada | |
| 8,572,482 B2 | 10/2013 | Yuan et al. | |
| 8,667,411 B2 | 3/2014 | Miyoshi | |
| 2007/0050700 A1 | 3/2007 | Simkhay et al. | |
| 2008/0134077 A1* | 6/2008 | Cheng ................. | G06F 16/9577 715/781 |

(Continued)

OTHER PUBLICATIONS

Bourg, Excel Scientific and Engineering Cookbook, 5 pages, Jan. 17, 2006.

(Continued)

*Primary Examiner* — Albert M Phillips, III
(74) *Attorney, Agent, or Firm* — Lowenstein Sandler LLP

(57) ABSTRACT

Systems and methods are disclosed herein for caching structural elements of electronic documents. A plurality of indices is stored in a data store. The plurality of indices corresponds to locations within an electronic document of portions of a stylized sub-element. A mutation to the electronic document is received and it is determined that the mutation pertains to a style of the stylized sub-element. Based on the mutation and the plurality of indices, the stylized sub-element is updated, and the portions of the updated stylized sub-element are caused to be displayed at a user device using a different style.

19 Claims, 16 Drawing Sheets

(56) References Cited

U.S. PATENT DOCUMENTS

2008/0301560 A1 12/2008 Rogers et al.
2010/0042913 A1 2/2010 Chamberlain et al.
2011/0252304 A1 10/2011 Lemonik et al.
2011/0252312 A1 10/2011 Lemonik et al.

OTHER PUBLICATIONS

SAS 9.4 Output Delivery System, 2nd Edition, 4 pages, Dec. 17, 2013.
Walkenbach, Excel 2013 Formulas, 6 pages, Apr. 1, 2013.
Walkenbach, Excel 2013 Power Programming with VBA, 11 pages, Apr. 1, 2013.
Schwulst, Google Spreadsheet Functions: Top 5 You Should Know How to Use, Mar. 18, 2014, pp. 1-5.
Control the Formatting When You Paste Text, downloaded from the internet on Dec. 2, 2014 at: https://support.office.com/en-nz/article/Control-the-fromatting-when-you-paste-text-20156a41-520e-48a6-8680-fb9ce15bf3d6, 9 pages.
Cheusheva, "Alternating row colors and column shading in Excel (banded rows and columns)," AbleBits; <https://www.ablebits.com/office-addins-blog/2014/03/13/alternate-row-column-colorsexcel/>; Published prior to Mar. 16, 2014 (14 Pages).
Darbyshire, Getting StartED with Google Apps, pp. 207-300. (Year: 2010).

\* cited by examiner

| | |
|---|---|
| THE | QUICK |
| BROWN | FOX |
| JUMPED | OVER |
| THE | LAZY |

600 — 602 (THE/QUICK), 604 (BROWN/FOX), 606 (JUMPED/OVER), 608 (THE/LAZY)

| | |
|---|---|
| THE | QUICK |
| BROWN | FOX |
| DOG'S | BACK |
| JUMPED | OVER |
| THE | LAZY |

630 — 632, 634, 635, 636, 638

| | |
|---|---|
| THE | QUICK |
| BROWN | FOX |
| DOG'S | BACK |
| JUMPED | OVER |
| THE | LAZY |

| 702 | THE | QUICK |
| --- | --- | --- |
| 704 | BROWN | FOX |
| 706 | JUMPED | OVER |
| 708 | THE | LAZY |

730

| 731 | DOG'S | BACK |
| --- | --- | --- |
| 732 | THE | QUICK |
| 734 | BROWN | FOX |
| 736 | JUMPED | OVER |
| 738 | THE | LAZY |

760

| 761 | DOG'S | BACK |
| --- | --- | --- |
| 762 | THE | QUICK |
| 764 | BROWN | FOX |
| 766 | JUMPED | OVER |
| 768 | THE | LAZY |

FIG. 7

SYSTEMS AND METHODS FOR CACHING STRUCTURAL ELEMENTS OF ELECTRONIC DOCUMENTS

RELATED APPLICATIONS

This application is a continuation application of copending U.S. patent application Ser. No. 16/512,333, filed Jul. 15, 2019, which is a continuation application of U.S. patent application Ser. No. 14/703,811, filed May 4, 2015, now U.S. Pat. No. 10,353,960, each of which is incorporated herein by reference.

FIELD OF THE INVENTION

In general, this disclosure relates to determining whether a mutation to an electronic document is a mutation to a structural element of the electronic document.

BACKGROUND

An electronic document can be stored as a one-dimensional string of characters. Structural elements of the electronic document can be delimited within the one-dimensional string of characters by markers. When a mutation to the electronic document is received by a document editing application, the editing application must determine whether the mutation is a mutation to a structural element of the electronic document by determining the location of the mutation relative to the markers within the one-dimensional string.

SUMMARY

Accordingly, systems and methods are described herein for updating a table in an electronic document. The processor stores a plurality of indices corresponding to locations within the electronic document of portions of the table in a database. The processor receives a mutation to the electronic document. Based on the plurality of indices, the processor determines that the mutation modifies the table. The processor updates the table, and the updated table is displayed at a user device.

In some aspects, the processor determines that the mutation modifies the table by determining that a location index of the mutation is between a start index of the plurality of indices and an end index of the plurality of indices. The processor can also determine that the mutation contains a marker of a structural feature of the table. The processor can also update the plurality of indices to include an additional index corresponding to a location of the marker within the electronic document.

In some aspects, the processor stores, in the database, a partial table index corresponding to a location within the electronic document of the partial table. The processor stores a text string containing the partial table in the database. The processor receives a second mutation to the electronic document. Based on the partial table index, the processor determines that the second mutation modifies the partial table. The processor modifies the text string based on the second mutation.

In some aspects, the processor determines that the second mutation completes the partial table to result in a completed table. The processor modifies the plurality of indices to include additional indices corresponding to locations within the electronic document of portions of the completed table. The processor updates the electronic document to include the completed table. The updated electronic document is displayed at the user device.

In some aspects, the processor receives a third mutation to the electronic document. The processor determines that the third mutation modifies the table in the electronic document to result in a partial table. The processor stores, in the database, a partial table index corresponding to a location within the electronic document of the partial table. The processor stores, in the database, a text string containing the partial table. The processor updates the plurality of indices to remove indices corresponding to locations within the electronic document of portions of the table. The processor updates the electronic document to remove the table. The processor displays the updated electronic document at the user device.

In some aspects, the processor updates the plurality of indices based on the mutation. The processor can determine the plurality of indices based on a one-dimensional text string containing the electronic document.

In some aspects, the processor receives a second mutation to the electronic document. The processor determines that the second mutation does not modify the table. The processor updates the plurality of indices and the electronic document based on the second mutation. The processor updates the electronic document based on the second mutation. The processor displays the updated electronic document at the user device.

In some aspects, the processor determines that the second mutation does not modify the table by determining that a location index of the second mutation is not between a start index of the plurality of indices and an end index of the plurality of indices.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 6 depicts three successive renderings of a table with a cell border conditional style while undergoing insertion of a row, according to an illustrative implementation;

FIG. 7 depicts three successive renderings of a table with a row-location-specific cell paragraph conditional style while undergoing insertion of a row, according to an illustrative implementation;

DETAILED DESCRIPTION

Figure 1:
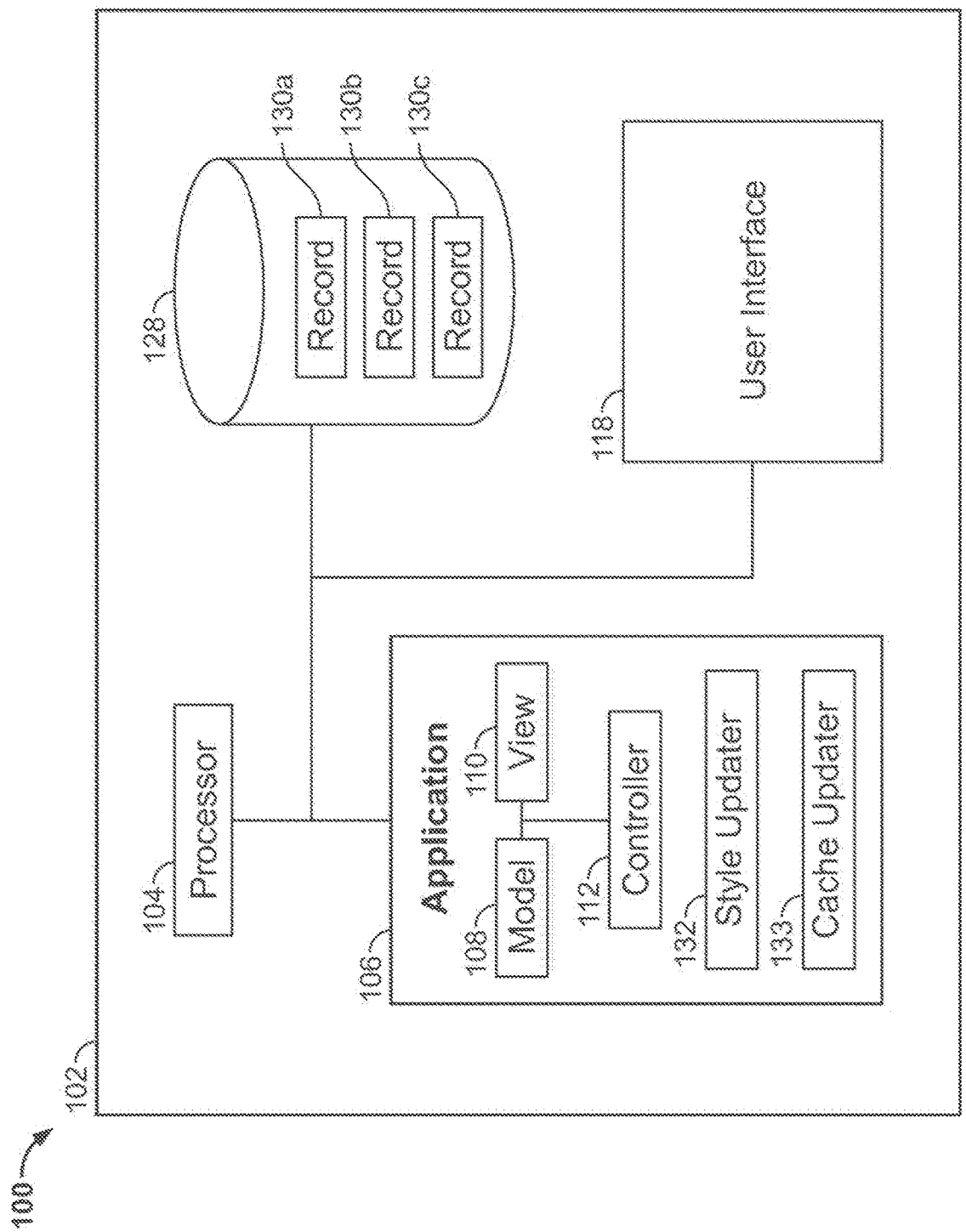
FIG. 1 depicts a system including a user device for updating a subset of an element of an electronic document based on one or more conditional styles, according to an illustrative implementation.

To provide an overall understanding of the disclosure, certain illustrative implementations will now be described, including a system for storing a performance cache for structural element information in an electronic document. One type of structural element is a table. In particular, a system is described in which the performance cache stores indices denoting the start of the table, the end of the table, and the start of each row and cell within the table, and other information regarding the size and position of the table and elements within the table. By caching this information, when a mutation to the document is received, an electronic document editor can quickly determine whether the mutation occurs within a table. Furthermore, the document editor can quickly determine other information about the table. In addition, a system is described which caches information about partial tables in the electronic document. In particular, when a mutation adding a partial table is received, this is cached separately without adding the partial table to the electronic document. This enables the electronic document model to satisfy its validation constraints, one of which disallows partial tables. When the remainder of the partial table is all received, the full table is added into the electronic document and into the performance cache. Creating and maintaining the performance cache requires additional overhead for every mutation to the document, not just table mutations. However, in many examples, such as large documents and complicated table structures such as nested tables, the benefits of the performance cache outweigh the overhead.

It will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more components, which include a processing device or devices, such as a computer, microprocessor, logic device or other device or processor that is configured with hardware, firmware, and software to carry out one or more of the computerized methods described herein.

As used herein, a property is a characteristic of an element of an electronic document that is associated with a value. A table is an example of an element of an electronic document having one or more properties. Some examples of properties of table cells are "background color," "width," "height," "top border width," "bottom border width," "left border width," "right border width," "top margin," "bottom margin," "left margin," "right margin," "horizontal alignment," "vertical alignment," and other characteristics of table cells known in the art. As used herein, a property does not fully define the characteristic unless a value is associated with the property. A value is a quantitative metric used to define the characteristic. Examples of values are colors such as "red" and "green," numbers such as "2" and "0.856," and sets of numbers such as "[0,1]" and "[1.68, 2.52, 3.91]." Colors can be represented as numbers such as RGB triplets defining the relative proportions of red, green, and blue in the color. For example, the RGB triplet representing "red" is "[1,0,0]," and the RGB triplet representing "green" is "[0, 1,0]."

Tables are elements in electronic documents that can have conditional styles, meaning that values of properties for cells of the table can depend on the relative location of cells in the table. For example, a table may have a conditional style defining a banded structure, in which odd rows have a red background color and even rows have a green background color. If a row is inserted at the top of the table, the conditional style requires that the background colors of the individual cells change to preserve the banded structure of the table. Thus, the inserted first row would have a red background color, and the original first row (now the second row) would now have a green background color. In another example, a table may have a conditional style defining that a cell's property values based on the cell's position relative to another cell within the table. In this illustrative example, a table may be formatted such that if any first cell is directly above a second cell containing the text, "SUM," the first cell has a background color of red and all other cells in the table have a background color of white. If a row is inserted into the table to insert a third cell between the first and second cells, the conditional styles would require changing the first cell's background color to "white" and the third cell's background color to "red." These examples are illustrative, and conditional styles can specify other property values based on other relationships in a similar manner.

Another type of conditional style that can be applied to a table is a location-specific conditional style. A location-specific conditional style specifies the formatting of a cell based on the cell's location in the table. The location can be specified by using the cell's row index, the cell's column index, or both. For example, a conditional style can require that all cells in a specified row of the table have a specified style. Furthermore, a conditional style can require that all cells in a specified column have a specified style. In some examples, conditional styles can require that cells in certain positions within the table, such as cells with a specified combination of row and column indices, have a specified style.

In some examples, a list is an element of an electronic document with conditional styles. In these examples, conditional styles can be used to specify styles of an item of a list based on the item's position in the list. In some examples, the list may be a bulleted or numbered list. For example, a conditional style in a bulleted list may require that the second item of the list have a specified style. If an item is added to the list above the second item, the conditional style would require that the new second item be formatted according to the specified style, and the third item be no longer formatted according to the specified style. These specified styles can be any of the styles described herein, such as background color, cell padding, and paragraph style.

Elements in electronic documents can inherit styles, properties, and values from other elements. When an element inherits properties from another element, values for the inherited properties are determined by reference to the other element of the document, such as a parent or source element. In an example, a document element may have a "font" property with an associated value "Times New Roman," and the text within a table cell may inherit from the document element. Here, the table cell will not be associated with an explicit value for the "font" property. Instead, the rendering module of the application will determine that the value for the "font" property should be the value of "Times New Roman" inherited from the document element. Thus, if the document font is changed, the font of the table cell will change. A document object model (DOM) may be used to determine from which element another element should inherit. A DOM is a hierarchical structure of elements or nodes, with each element having zero or one parent elements and zero, one, or more child elements. The rendering module will determine the element from which another element should inherit by utilizing a set of rules. The rules may be embedded in the application, and may be associated with the file format of the document. In some examples, the rules can require the use of the DOM hierarchy to determine the value of an inheriting property. For example, a rendering module may start at the element in question and traverse up the hierarchy until an element with a value defined for the property in question is reached. The rendering module will then assign this value to the element in question.

Electronic documents can be stored in files and edited by applications. An application generally has its own associated native file format which specifies encoding of the features that the application supports. Applications will typically handle properly only those features which are supported by the application's native format. Any features which are unsupported by the application's native format will encounter problems loading or will load incorrectly. Thus, pasting an element into a destination application, if the element was created with a different source application, can cause loss of data. In particular, this occurs when the element has features that are not supported by the destination application.

A file may have a file format which determines the manner in which the file's information is encoded into bits in memory, and further, the manner in which that information is decoded from memory and presented to a user. Generally speaking, a file has a file format that is based on the application that was used to create the file, such as the application's native file format. File formats may be simple or complex. A simple file format is the American Standard Code for Information Interchange (ASCII), which encodes plain text and some simple characters. An example of a complex file is the format used to encode information in a word processing document. A word processing format may, for example, specify the encoding method for fonts, font sizes, font styles, font colors, tabs, paragraphs, bulleted lists, numbered lists, tables, text wrapping, text alignment, text highlighting, line spacing, page breaks, page size, margins, columns, headers, footers, footnotes, endnotes, cross-references, tables of contents, indices, and embedded content such as images and video. A spreadsheet format is also complex and may specify the encoding method for cell contents, formula operations, fonts, font sizes, font styles, font colors, cell borders, cell colors, and charts. A presentation format is also complex and may specify the encoding method for fonts, font sizes, font styles, font colors, text boxes, shapes, slide size, position and arrangement of items within a slide, slide ordering, slide transitions, animations, and embedded content such as images, video, and spreadsheets. Formats may specify the manner in which elements inherit from other elements. Formats may also specify the manner in which conditional styles and raw styles are resolved into concrete values.

File formats may incorporate other formats. For example, word processing, spreadsheet, and presentation formats may all incorporate the ASCII format to encode text, but may use additional encoding methods specific to the format to encode features other than text. A file containing a document may be encoded according to a format appropriate to the document. A file may contain a word processing document, a spreadsheet document, a presentation document, a drawing document, a database document, a HyperText Markup Language (HTML) document, an Extensible Markup Language (XML) document, an image document, a text document, or any other document containing user data. When opening and editing a file, an application utilizes the file's format to decode the bits stored in memory and present the decoded information to a user.

FIG. 1 depicts a system 100 for updating a subset of an element of an electronic document based on one or more conditional styles. The system 100 includes a user device 102 which can be used to display and edit the electronic document. The user device 102 includes a processor 104, an application 106, a database 128, and a user interface 118. The application 106 can be stored as a set of instructions in a memory of the user device 102, such as the database 128 or another transitory or non-transitory memory of the user device 102. The processor 104 can execute the stored instructions to run the application 106. The application 106 includes a model module 108, a view module 110, and a controller module 112. Together, the model module 108, the view module 110, and the controller module 112 can be used in conjunction to display and edit an electronic document using a model-view-controller paradigm. The application 106 also includes a style updater module 132 and a cache updater module 133. Using the systems and methods described herein, the style updater module 132 can update subsets of an element of an electronic document displayed and edited by the application 106. Using the systems and methods described herein, the cache updater module 133 can create, update, and maintain a cache of information about structural elements of the electronic document. The application 106 can contain other modules to implement other functions of displaying and editing electronic documents.

The database 128 contains database records 130a, 130b, and 130c (collectively, records 130), which can store data associated with applications and electronic documents. In some examples, one or more records of records 130 stores instructions for running the application 106. In some examples, one or more records of the records 130 stores the electronic document being displayed and edited by the application 106. In some examples, one or more of the records 130 contains associations used to update subsets of elements of the electronic document, as will be described in more detail with respect to FIG. 3. In some examples, the database 128 has a number of records different from the number depicted in FIG. 1.

The user interface 118 can include a display for displaying the electronic document to a user. The user interface 118 can also include a user input device to receive user modifications to the electronic document. By facilitating communication between the application 106, the style updater module 132, and the database 128, the system 100 can provide document display, editing, and updating of subsets of elements of the electronic documents in a single device 102.

Figure 2:
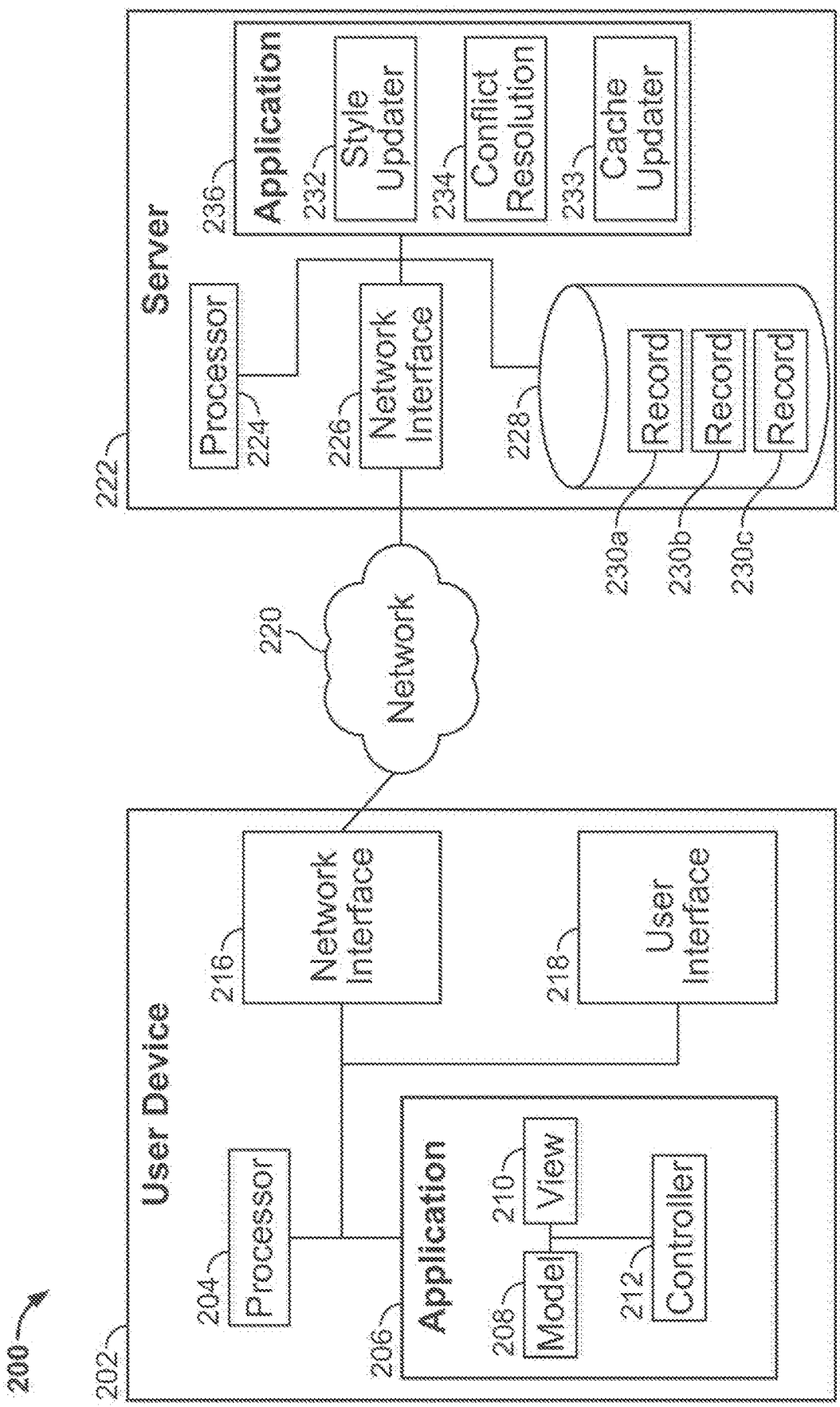
FIG. 2 depicts a networked system for updating a subset of an element of an electronic document based on one or more conditional styles, according to an illustrative implementation.

FIG. 2 depicts a system 200 for updating a subset of an element of an electronic document based on one or more conditional styles. The system 200 includes a user device 202 and a server 222, in communication with each other via a network 220. The user device 202 includes a processor 204, an application 206, a network interface 216, and a user interface 218. The user device 202 can include a memory for storing instructions used by the processor to execute the application 206. The application 206 can include a model module 208, a view module 210, and a controller module 212. Together, the model module 208, the view module 210, and the controller module 212 can display and edit an electronic document using a model-view-controller paradigm. The user interface can include a display for displaying the electronic document and a user input device for receiving data modifications to the electronic document. The network interface 216 communicates with the network 220 to receive data sent to the user device to via the network 220, and to transmit data from the user device to via the server 222 and other devices.

[The network 220 can be a network such as the Internet, the World Wide Web, a local area network, a wide-area network, an intranet, a cellular network, or another telecommunications network.

The server 222 includes a processor 224, a network interface 226, a database 228, and an application 236. The server 222 and also include a memory storing instructions used by the processor 224 to run the application 236. The network interface 226 can be used to receive data from the user device 202 and transmit data to the user device 202. The application 236 includes a style updater module 232, a cache updater module 233, and a conflict resolution module 234. The style updater 232 can perform functions similar to the functions performed by the style updater 132. Using the systems and methods described herein, the cache updater module 233 can create, update, and maintain a cache of information about structural elements of the electronic document. The conflict resolution module 234 can resolve conflicts arising in situations in which an electronic document is edited by one or more users using a plurality of devices simultaneously. In these situations, the server 222 can receive edits to the electronic document from two or more devices, and these edits can conflict with each other. The conflict resolution module 234 can resolve these conflicts to present the same document for display to each of the devices.

The database 228 can perform functions similar to functions performed by the database 128. The database 228 includes three records, records 230a, 230b, and 230c (collectively, records 230). Records 230 and store instructions to execute the application 236, data files for electronic documents, and/or associations used by the style updater module 232 to update subsets of an element of an electronic document based on one or more conditional styles. While the database 228 is depicted as containing three records 230, the database 228 can contain any number of records.

In the distributed document editing system 200, document editing functions are distributed between the user device 202 and the server 222. The user device 202 displays the electronic document to a user and receives edits to the electronic document from the user. In conjunction with the user device 202, the server 222 provides other document editing functions via the application 236, such as style updating and conflict resolution. The server 222 can also store data files in the database 228, thus making the electronic document accessible from a plurality of user devices. In addition, remote document storage reduces the storage capacity required on the user device 202. For purposes of clarity, FIG. 2 depicts the system 200 as containing one user device 202 and one server 222. In some examples, the system 200 can contain more than one user device. In some examples, the system 200 can contain more than one server. By distributing document editing functionality between the user device 202 and the server 222, the system 200 allows for flexibility in choice of user device. In this way, software and hardware requirements for the user device 202 are reduced, and multiple user devices may be used to display and edit the electronic document.

Any of the functions described herein as being performed by the system 100 or its components, such as the application 106 and the style updater 132, can be performed by the system 200 or its corresponding components, such as the application 206, the application 236, and the style updater 232.

Figure 3A:
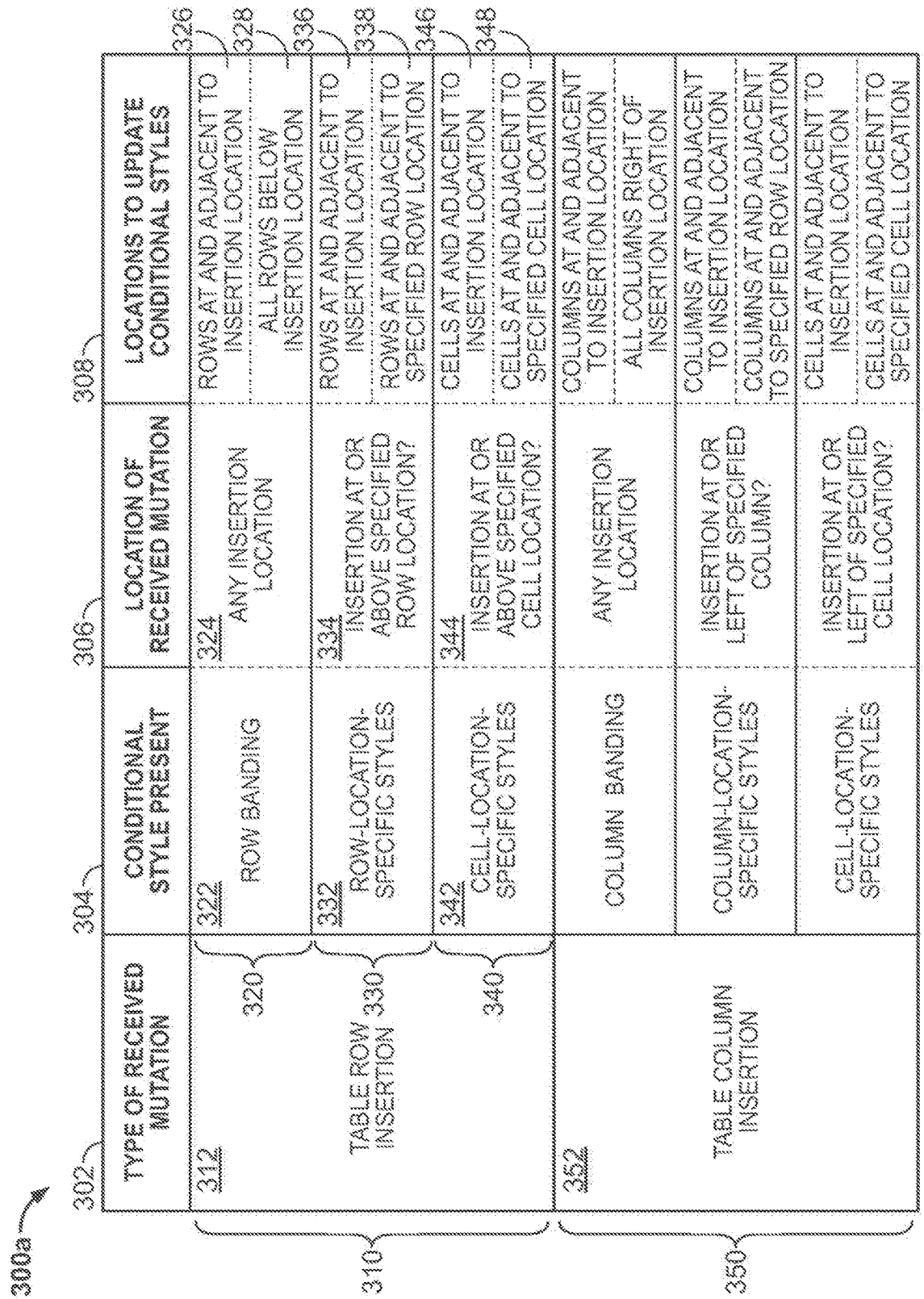
FIGS. 3A and 3B depict sets of records used to associate types of mutations with conditional styles, locations of the mutations, and locations to be updated, according to an illustrative implementation.
Figure 3B:
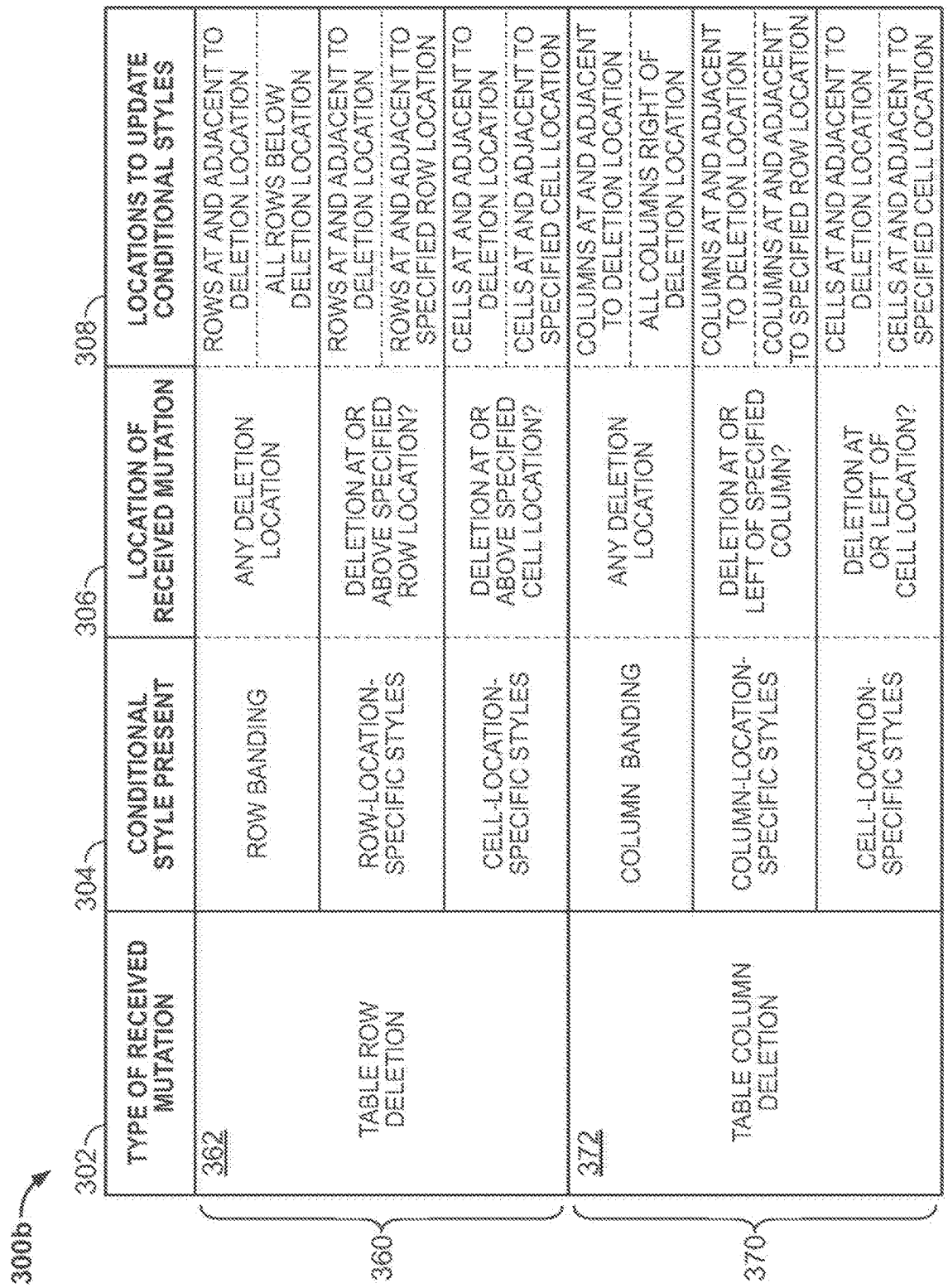

FIGS. 3A and 3B depict a set of records 300a and a set of records 300b (collectively, set of records 300) used to associate types of mutations with conditional styles, locations of the mutations, and locations to be updated. The set of records 300 includes four records 310, 350, 360, and 370. The records 310, 350, 360, and 370 represent some examples of records 130 in the database 128 and records 230 in the database 228. Each record in the set of records 300 includes one or more items and each of four categories 302, 304, 306, and 308. The category 302 includes entries for types of mutation to an electronic document received by either any of the applications 106, 206, and 236. These received mutations can be insertion or deletion of table rows, insertion or deletion of table columns, insertion or deletion of items in a list, or other mutations to elements of an electronic document.

The category 304 includes entries for types of conditional styles that may be present in elements of an electronic document. These conditional styles may be any of the conditional styles described herein. The category 306 includes entries for locations of the received mutation. These locations may be specified relative to the position of the mutation within an element of the electronic document, or these locations may be specified relative to the position of the mutation within the electronic document. The category 308 includes entries specifying locations within an element of an electronic document at which conditional styles for the element should be updated, based on associations stored in the set of records 300.

The record 310 includes a single entry 312 in the category 302. The entry 312 indicates the record 310 relates to an insertion of a row into a table. Thus, the record 310 contains associations to be used when a table row is inserted into a table of an electronic document. The record 310 includes three entries 314, 316, and 318 in the category 304.

Each record in the set of records 300 contains one or more sub-records. The record 310 contains three sub-records, sub-records 320, 330, and 340. For purposes of clarity in the following discussion, the interaction between the style updater 132 and the set of records 300 will be described. However, in some examples, the style updater 232 can perform some or all of the functions described herein as being performed by the style updater 132. A style updater, such as the style updater 132 or the style updater 232, uses the set of records 300 in the following manner to determine locations of an element at which styles should be updated.

When the style updater 132 receives a mutation to an element of an electronic document, the style updater 132 determines a type of the received mutation. The style updater 132 searches the set of records 300 to determine if a record in the set of records 300 has an entry in the category 302 associated with the type of received mutation. If a record in the set of records 300 has an entry in the category 302 associated with the type of received mutation, the style updater 132 reads data from the associated record to determine locations of the element at which conditional styles should be updated. In an illustrative example, the received mutation is a table row insertion, and the style updater 132 determines that the record 310 is associated with table row insertions. The style updater 132 makes this determination by determining that the record 310 contains an entry 312 in the category 302 indicating that the record 310 is associated with table row insertions.

After selecting the record 310, the style updater 132 determines whether the element to be modified by the received mutation contains conditional styles associated with the record 310. The record 310 contains three sub-records 320, 320, and 340, each associated with a type of conditional style. The sub-record 320 contains an entry 322 in the category 304 indicating that the sub-record 320 is associated with a row banding conditional style. The sub-record 330 contains an entry 332 in the category 304 indicating that the sub-record 330 is associated with a row-location-specific conditional style. The sub-record 340 contains an entry 342 in the category 304 indicating that the sub-record 340 is associated with a cell-location-specific conditional style. Thus, the style updater 132 determines whether the element of the electronic document contains a conditional style associated with the record 310 by searching sub-records of the record 310 to determine if a sub-record of the record 310 is associated with conditional styles of the element.

After determining that a sub-record is associated with a conditional style of the element, the style updater 132 determines whether the location of the received mutation requires updating of the element's conditional styles. The style updater 132 determines whether updating is required by determining the location of the received mutation and then determining whether the mutation location is associated with the sub-record. The style updater 132 determines whether the mutation location is associated with the sub-record by searching the selected sub-record for entries in the category 306.

In an example, the element is a table, the received mutation is a table row insertion, and the table has a conditional style of row banding. In this example, the style updater 132 selects the record 310 and the sub-record 320. The style updater determines the location within the table of the received mutation and compares this to any entries in the category 306 of the sub-record 320. The sub-record 320 contains an entry 324 in the category 306 that associates the sub-record 320 with any insertion location. Thus, for a table row banding property, the style updater 132 will update conditional styles, regardless of the location of the row insertion.

After determining, using the entry 324, that the table should be updated based on the conditional styles present, the style updater 132 searches any entries in the category 308 of the sub-record 320 to determine locations of the table at which conditional styles should be updated. The sub-record 320 contains entries 326 and 328 in the category 308. The entry 326 indicates that conditional styles should be updated for rows at and adjacent to the insertion location. The entry 328 indicates that the conditional styles should be updated for rows at and below the insertion location. Thus, the sub-records 326 and 328 in the category 308 indicate locations of cells in the table for which their conditional styles may be affected by the received mutation, and excludes locations of cells in the table for which their conditional styles will not be affected by the received mutation. Thus, the sub-record 320 indicates that insertion of a table row may affect the row banding style of rows at, adjacent to, and below the insertion location, allowing the style updater 132 to only update the row banding style of cells in those locations. By not updating the row banding style of cells not specified in the entries 326 and 328, the style updater 132 improves the efficiency of the application 106 when handling conditional styles.

The sub-records 330 and 340 share a structure similar to the structure of the sub-record 320. The sub-record 330 contains an entry 322 in the category 304 indicating that the sub-record 330 is associated with row-location-specific conditional styles. Such row-location-specific conditional styles can include specified background color, cell padding, and paragraph styles or specific rows in the table. Examples of specific rows in the table include the first row in the table, the last row in the table, the second row in the table, the second from last row in the table, or any other location linked to the position of a row in the table. As described herein, a specified row location is the location specified by a row-location-specific property.

The sub-record 330 includes an entry 334 in the category 306. The entry 334 indicates that conditional styles should be updated if the row insertion is located at or above a row specified in a row-location-specific property indicated by the entry 332. Thus, for row insertions located below a specified row location of a row-location-specific property, conditional styles of the table will not be updated since the row insertion will not affect the relative position of cells having row-location-specific properties. The sub-record 330 includes two entries 336 and 338 in the category 308. The entry 336 indicates that conditional styles of rows at and adjacent to the insertion location should be updated. The entry 338 indicates that conditional styles of rows at and adjacent to the specified row location should be updated.

The sub-record 340 includes an entry 342 in the category 304 indicating that the sub-record 340 is associated with cell-specific properties. Cell-location-specific properties include properties linked to the relative position of a cell within a table. Examples of relative positions include a cell in the left most column and upper most row of a table, a cell in a right most column and lower most row of a table, and any other specification of a cell's position in the table. As described herein, a specified cell location is the location specified in a cell-location-specific property.

The sub-record 340 includes an entry 344 in the category 306. The entry 344 indicates that if the inserted row is located at or above a cell location specified in a cell-location-specific property of the entry 342, conditional styles of parts of the table may require updating. The sub-record 340 includes entries 346 and 348 in the category 308. The entry 346 indicates that conditional styles of rows at and adjacent to the location of the inserted row should be updated. The entry 348 indicates that conditional styles of cells at and adjacent to the cell location specified in the entry 342 should be updated.

The records 350, 360, and 370 have structures similar to the structure of the record 310. The record 350 includes an entry 352 in the column 302 indicating that the record 350 is associated with insertion of table columns. The record 360 includes an entry 362 in the category 302 indicating that the record 360 is associated with deletion of table rows. The record 370 includes an entry 372 in the category 302 indicating that the record 370 is associated with deletion of table columns. The style updater 132 searches the records 350, 360, and 370 in a manner similar to the searching of the record 310 described herein.

For insertion or deletion of multiple rows or columns, the style updater 132 can search and apply the records 300 as described above, but with the following modified definition of adjacency. The style updater 132 can adjust the definition of adjacency by adjusting the number Of rows or columns subject to insertion or deletion. For example, if two rows are inserted, instead of updating styles at the row immediately above and the row immediately below the insertion location, the style updater can update conditional styles at the two rows immediately above and the two rows immediately below the insertion location. The style updater 132 can adjust the definition of adjacency in a similar manner for insertion or deletion of different numbers of rows or columns.

While the records 300 depict four examples of types of mutations to tables, the records 300 can also include records associated with other types of mutations to other types of elements of electronic documents. For example, the records 300 can include records associated with insertion or deletion of items in a list, headings in a document, captions in a document, and other elements of electronic documents having structure.

Figure 4:
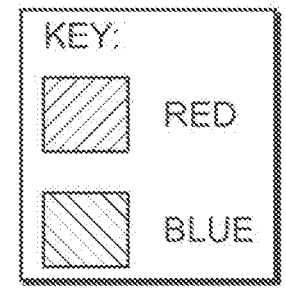
FIG. 4 depicts three successive renderings of a table with a row banding conditional style while undergoing insertion of a row, according to an illustrative implementation.

FIG. 4 depicts updating conditional styles in a table upon insertion of a table row, according to the systems and methods described herein. FIG. 4 includes three successive renderings of a table, renderings 400, 430, and 460. The table depicted in FIG. 4 has a conditional style of row banding specifying that the background color of a row is determined by the row's position in the table. Specifically, the conditional style specifies that rows having row indices with odd parity have a background color property value of red, and rows with row indices having even parity have a background color property value of blue. In this example, the background color property value is not linked to the text of a particular cell or row, but rather to a cell's position in the table. The rendering 400 includes rows 402, 404, 406, and 408. The rows 402 and 406 are the first and third rows of the table, and thus their row indices have odd parity. Since the row indices of rows 402 and 406 have odd parity, the background color properties of cells in rows 402 and 406 have values of red. The rows 404 and 408 are the second and fourth rows of the table, respectively, and thus their row indices have even parity. Since the row indices of rows 404 and 408 have even parity, cells in the rows 404 and 408 have a background color property value of blue.

The rendering 430 depicts the table shown in the rendering 400 after a row insertion. The rendering 430 includes rows 432, 434, 435, 436, and 438. The row 435 is inserted between the two previously existing rows 434 and 436. Prior to operation of the style updater 132, the table as depicted in the rendering 430 has incomplete banding, since the adjacent rows 435 and 436 have the same background color.

The rendering 460 depicts the table after the operation of the style updater 132. The rendering 460 includes rows 462, 464, 465, 466, and 468. The style updater 132 has searched the set of records 300, determined that the received mutation (a table row insertion) is associated with the record 310, has determined that the table includes a conditional style of row banding associated with the sub-record 320, has determined that the location of the row insertion satisfies the conditions of the entry 324, and has updated the background color properties of the row banding conditional style of the table at the locations specified by the entries 326 and 328. Accordingly, the style updater 132 has updated the rows 464, 465, and 466 since these rows are at and adjacent to the insertion location. Since one row was inserted, cells having a distance of one row from the insertion location are deemed to be adjacent cells. Furthermore, the style updater 132 updates the background color property of the row 468 since the row 468 is below the location of the insertion. The style updater 132 does not update the background color property of the row 462 since the location of the row 462 does not meet the conditions specified in the entries 326 and 328. By only updating subsets of the table specified by the set of records 300, the style updater has an improved performance, since unnecessary operations are not performed. This improved performance may especially be useful on low-power devices such as mobile devices, or when implementing document editing applications using a network. The advantages are reduced power consumption, reduced network traffic, and faster update rates.

Figure 5:
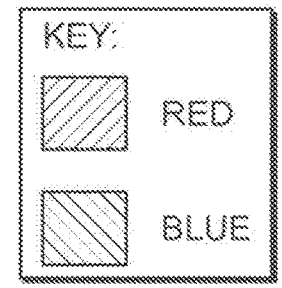
FIG. 5 depicts three successive renderings of a table with a row-location-specific conditional style while undergoing insertion of a row, according to an illustrative implementation.

FIG. 5 depicts three successive renderings of a table with a row-location-specific conditional style while undergoing insertion of a row. FIG. 5 includes renderings 500, 530, and 560, each depicting the table at a point in time during the update process. The row-location specific conditional style of the table depicted in FIG. 5 specifies that the first row has a background color property value of red and the last row has a background color property value of blue. This conditional style is linked to the position of rows within the table, and is not linked to the contents of the any cell within the row. Thus, the table should maintain these conditional styles upon changes to the table structure. The rendering 500 includes four rows of the table, rows 502, 504, 506, and 508. Since the row 502 is the first row in the table, the row 502 has a background color property value of red. Since the row 508 is the last row in the table, the row 508 has a background color property value of blue.

The rendering 530 depicts the table immediately after an insertion of a row above the previous first row and the insertion of a row below the previous last row. The rendering 530 includes the rows 531, 532, 534, 536, 538, and 539. The row 531 has been inserted above the previous first row, row 532. Before operation of the style updater 132, the row 531 takes the background color property value of the nearest row, row 532, and the row 532 has the same background color property value as the row 502 in the rendering 500. Before the operation of the style updater 132, the row 539 has a background color property value of the nearest row, row 538, and the row 538 has an unchanged background color property value. However, before the operation of the style updater 132, the table as rendered in the rendering 530 does not comply with its prescribed conditional style. Accordingly, the style updater 132 operates to update the table to comply with the prescribed conditional style.

The rendering 560 depicts the table after operation of the style updater 132. The rendering 560 includes the row 561, 562, 564, 566, 568, and 569. For each of the two row insertions, the style updater 132 has searched the set of records 300, determined that each of the received mutations (each a table row insertion) is associated with the record 310, determined that the table includes a row-location-specific conditional style associated with the sub record 332, determined that the locations of the row insertions meet the criteria specified by the entry 334, and has updated properties of conditional styles of rows in the locations specified by the entries 336 and 338. The rows 561, 562, 568, and 569 meet the location criteria specified in the entries 336 and 338 and are accordingly updated by the style updater 132. The rows 564 and 566 do not meet the location criteria specified by the entries 336 and 338 and are accordingly not updated by the style updater 132. By only updating subsets of the table, the style updater 132 improves the performance of the application 106.

FIG. 6 depicts three successive renderings of a table with a cell border conditional style while undergoing insertion of a row. FIG. 6 includes three renderings, renderings 600, 630 and 660. The rendering 600 depicts the table prior to insertion of a row. The rendering 600 includes four rows, row 602, 604, 606, and 608. The table has a cell-location-specific conditional style specifying that the cell located in the first column and third row has a thick cell border. Since the style is a cell-location-specific style, the thick cell border is linked to the position of the cell within the table, and not the text of the cell.

The rendering 600 depicts the table after insertion of a row and before operation of the style updater 132. The rendering 630 includes five rows, rows 632, 634, 635, 636, and 638. The row 635 has been inserted between the rows 634 and 636. Since the style updater 132 has not operated on the table yet, the table as depicted in the rendering 630 does not comply with its prescribed conditional style.

The rendering 660 depicts the table after operation of the style updater 132. The rendering 660 includes five rows, rows 662, 664, 665, 666, and 668. The style updater 132 has searched the set of records 300, determined that the received mutation (insertion of a row) is associated with the record 310, as determined that the table has a cell-location-specific property associated with the sub-record 340, has determined that the location of the received mutation meets the criteria of the entry 344, and has updated conditional styles of cells and locations specified by the entries 346 and 348. Thus, since the cells in rows 664, 665, and 666 meet the location criteria of the entries 346 and 348, cells in these rows are updated. Cells in rows 662 and 668 are not updated by the style updater since these cells do not meet the location criteria of the entries 346 and 348.

FIG. 7 depicts three successive renderings of a table with a row-location-specific cell paragraph conditional style while undergoing insertion of a row. FIG. 7 includes three renderings, renderings 700, 730, and 760. The rendering 700 depicts the table prior to insertion of a row. The rendering 700 includes four rows, rows 702, 704, 706, and 708. The row location-specific property of the table requires the underlying of text of cells in the first row. Accordingly, text in the cells of the row 702 is underlined.

The rendering 730 depicts the table after insertion of a row above the previous first row, but before operation of the style updater 132. The rendering 730 includes rows 731, 732, 734, 736, and 738. The row 731 has been inserted above the previous first row 732. Since the style updater 132 has not yet operated, the table does not comply with its prescribed conditional style.

The rendering 760 depicts the table after operation of the style updater 132. The rendering 760 includes five rows, rows 761, 762, 764, 766, and 768. The style updater 132 has searched the set of records 300, determined that the received mutation (a table row insertion) is associated with the record 310, has determined that the table has a row-location-specific property associated with the sub-record 330, has determined that the location of the received mutation meets the criteria of the entry 334, and has updated properties of cells at locations specified by the entries 336 and 338. Accordingly, the style updater 132 has updated cells in the rows 761 and 762. The style updater has not updated cells in the rows 764, 766, and 768, since they do not meet the location criteria of the entries 346 and 348. Since, for the conditional style present in the table depicted in FIG. 7, the depicted row insertion does not affect conditional styles of the rows 764, 766, and 768, updating of conditional styles in these rows is not necessary. Accordingly, by not updating conditional styles in the rows 764, 766, and 768, the style updater 132 improves the performance of the application 106.

Figure 8:
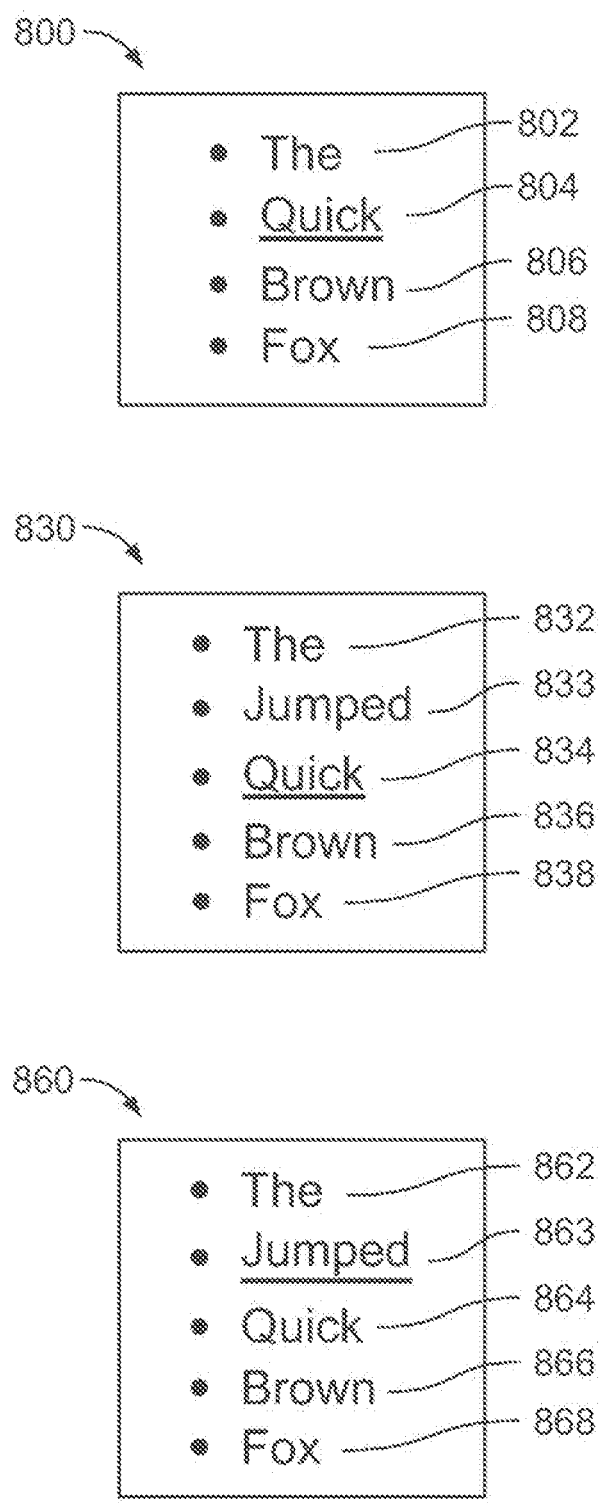
FIG. 8 depicts three successive renderings of a list having an item-location-specific conditional style while undergoing insertion of an item, according to an illustrative implementation.

FIG. 8 depicts three successive renderings of a list having an item-location-specific conditional style while undergoing insertion of an item. FIG. 8 depicts three renderings, renderings 800, 830, and 860. The rendering 800 depicts the list which contains four items, items 802, 804, 806, and 808. The list depicted in FIG. 8 is a bulleted list with a conditional style specifying that the second item in the list is underlined.

The rendering 830 depicts the list after insertion of an item and before operation of the style updater 132. The rendering 830 includes five items, items 832, 833, 834, 836, and 838. The item 833 has been inserted between the items 832 and 834. Since the style updater 132 has not operated on the list, the list does not comply with its prescribed conditional style.

The rendering 860 depicts the list after operation of the style updater 132. The rendering 860 includes five items, items 862, 863, 864, 866, and 868. The style updater 132 has searched the set of records 300, determined that the received mutation, insertion of a list item, is associated with an entry in category 302 of a record, has determined that the list has a conditional style associated with an entry in the category 304 of a sub record of the record, has determined that the location of the received mutation meets the criteria of an entry in the category 306 of the sub record, and has updated items meeting location criteria specified in entries of the sub record in category 308. Accordingly, the style updater 132 has updated items 862, 863, 864, and 866. After operation of the style updater 132, the list complies with its prescribed conditional style. By using the set of records 300 to determine a subset of the list to update, the style updater improves the performance of the application 106.

While FIGS. 4-8 depict insertions of rows into tables and insertion of an item into a list, the style updater 132 can be used for updating upon insertion of columns into a table, deletion of rows or columns from a table, deletion of items from a list, and other mutations to elements of electronic documents described herein.

Figure 9:
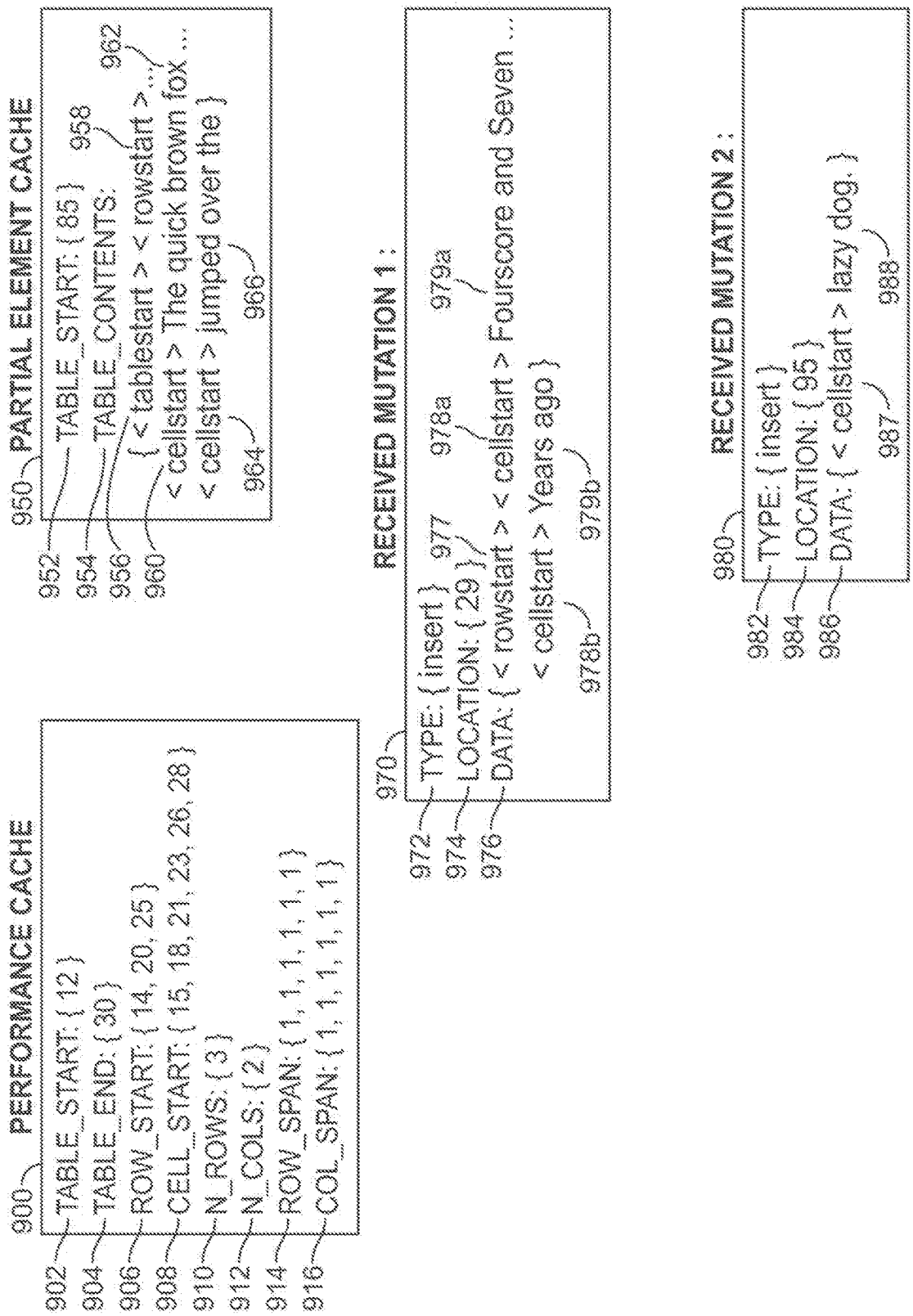
FIG. 9 depicts caches and mutations to an electronic document stored as a one-dimensional string of characters.

FIG. 9 depicts caches and mutations to an electronic document stored as a one-dimensional string of characters. FIG. 9 depicts a performance cache 900, a partial element cache 950, and two received mutations 970 and 980. The application 106 can create the performance cache 900 by parsing a one-dimensional string storing the electronic document for markers indicating elements of the electronic document. The performance cache 900 includes locations and sizes of table structures within the one-dimensional string. The performance cache 900 includes a table start entry 902 and a table end entry 904. Together, these two entries 902 and 904 identify the table as being located between the 12th and 30th characters of the one-dimensional string. The performance cache 900 also includes a row start entry 906 and a cell start entry 908. The entries 906 and 908 indicate locations of structural sub-elements of the table within the electronic document. The row start entry 906 indicates that the table contains three rows, starting at the 14th, 20th, and 25th characters of the one-dimensional string, respectively. The cell start entry 908 includes 6 indices, indicating that the table contains 6 cells starting at the 15th, 18th, 21st, 23rd, 26th and 28th characters of the one-dimensional string, respectively.

The row start entry 906 and cell start entry 908 can be used to determine locations of structural sub-elements of the table. For example, by searching the row start entry 906, it can be determined that the first row is found between the 14th and 20th characters of the one-dimensional string, and likewise that the second cell in the document is found between the 18th and 21st characters of the one-dimensional string.

The performance cache 900 also includes entries 910 and 912 which indicate the number of rows and columns in the table, respectively. By searching the entries 910 and 912, the size of the table can be quickly determined.

The performance cache 900 also includes a row span entry 914 and a column span entry 916. The entries 914 and 916 each include an integer for each cell of the table. The row span entry 914 includes 6 integers, each having a value of "1." This indicates that each of the cells in the table span only a single cell in the row dimension (in other words, none of the cells in the table are merged in the row dimension). Likewise, the column span entry 916 includes 6 integers, each having a value of "1." In a similar manner as the row span entry 914, the column span 916 indicates that none of the cells in the table are merged in the column dimension. Non-unity values in either of the row span entry 914 or the column span entry 916 would indicate merging of cells. Merging of table cells is further described in U.S. patent application Ser. No. 14/468,861, entitled "Systems and Methods for Emerging Table Cells Via Expansion," the entire contents of which are incorporated herein by reference.

The partial element cache 950 stores data relating to partial tables received by the application 106 but not yet incorporated into a model representing the electronic document. The model representing the electronic document may be a DOM. The application 106 can create the DOM by parsing the one-dimensional string storing the electronic document. The partial element cache 950 includes a partial table start entry 952 and a partial table contents entry 954.

The table start entry 952 includes an index corresponding to the location of the start of the partial table within the one-dimensional string for electronic document. Accordingly, the index of the table start entry 952 indicates that the partial table stored in the partial element cache 950 begins at the 85th character of the one-dimensional string.

The partial table contents entry 954 includes the received partial contents of the partial table. The table contents entry 954 includes a partial table start marker 956, a row start marker 958, two cell start markers 960 and 964, and cell text 962 and 966. Since the partial table contents entry 954 does not contain a table end marker that is paired with the partial table start marker 956, the table contained in the table contents entry 954 is a partial table. A full table is a table with a matching number of table start markers and table end markers, and conversely, a partial table is a table without matching numbers of table start markers and table end markers. Only partial tables are stored in the partial element cache 950, and when the application 106 determines that the partial table contents entry 956 contains an equal number of table start markers and table end markers, the newly complete table is moved from the partial element cache 950 into the model for the electronic document, and the performance cache 900 is updated to reflect the new table. In this way, the partial element cache 950 stores data for partial tables until data completing the partial table is received. Since some models contain constraints requiring the models to contain only complete tables, the partial element cache 950 enables integration of partial table operations with such models.

Partial tables can be received from third-party add-ons to a document at ending system, on initial load of a model representing an electronic document, and when suggested insertions are present in a table of an electronic document.

The received mutation 970 represents an addition to the table stored in the performance cache 900. The received mutation 970 includes a type 972, a location 974, and data 976. The type 972 indicates that the received mutation 970 is an insertion. The location 974 includes an index denoting the location of the mutation within the one-dimensional string storing the document. The data 976 includes the data to be inserted at the location 974. The data 976 includes a row start marker 977, cell start markers 978a and 978b, and text 979a and 979b. Accordingly, the mutation 970 is an instruction to insert below the last row of the table an additional row with two cells, the first cell containing the text of "Fourscore and Seven" and the second cell containing the text "Years ago."

Upon receiving the mutation 970, the controller 112 can compare the location 974 to the table start entry 902 and the table end entry 904 to determine that, since the location 974 is greater than the table start entry 902 and less than the table end entry 904, the mutation 970 is located within the table stored in the performance cache 900. Then, the controller 112 can determine, using the indices of the row start entry 906, that the location 974 places the mutation after the existing third row of the table. Furthermore, by comparing the location 974 to the indices in the cell start entry 908, the controller 112 can determine that the mutation 970 is to be placed after the last cell of the table.

By making these two comparisons, the controller 112 can determine that the mutation 970 is an instruction to insert an additional row into the table below the existing last row of the table. After making this determination, the controller 112 updates the model of the electronic document to include the additional table row and text. The application 106 may then use the style updater module 132 to update other portions of the table whose styles are affected by the mutation 970.

The received mutation 980 is a mutation to the partial table stored in the partial element cache 950. The received mutation 980 includes a type 982, a location 984, and data 986. The type 982 indicates that the mutation 980 is an insertion. The location 984 contains an index indicating the location of the mutation 980 within the one-dimensional string. Since the location 984 contains an index not included in the range denoted by the table start entry 902 and the table end entry 904, the mutation 980 is outside the table stored in the performance cache 900. Accordingly, the mutation 980 is not a mutation to a partial table. Since the location 984 occurs after the index of the table start entry 952, the mutation 980 is a mutation to the partial table stored in the partial element cache 950.

The data 986 includes a cell start marker 987 and a text string 988. Accordingly, the data 986 indicates that an additional cell should be inserted containing text "lazy dog." Since the mutation 980 does not contain a table end marker that would pair with the table start marker 956, the partial table remains a partial table and remains in the partial element cache 950.

After receiving any mutation to the electronic document, the application 106 updates indices stored in the performance cache 900 and the partial element 950 as necessary. The application 106 updates the indices by adjusting affected indices by the length of the mutation. For example, if a single character is inserted at the beginning of the document, even if the single character is not inserted into a table, the application 106 increments all indices in the performance cache and in the partial element cache by one to accommodate the single inserted character. If two characters are inserted at the very start of the document, then the application 106 increments all indices in the performance cache 900 and the partial element cache 950 by two. If a character string is inserted within a table, the application 106 increments all indices with locations in the one-dimensional string after the insertion location by the length of the inserted character string. If the mutation is a deletion, the application can decrement (i.e. increment by a negative number) affected indices by the length of the deletion. In this way, the indices stored in the performance cache 900 and the partial element 950 are kept current.

While the performance cache 900 depicted in FIG. 9 includes information about only one table, the performance cache 900 can include information about any number of tables. In addition, the performance cache 900 can include information about nested tables. Nested tables are tables located within other tables. For example, a cell of a first table may contain, within the cell, an entire second table. Thus, the second table would be nested within the first table. In this example, both the table start index and table end index of the second table would be greater than the table start index of the first table but less than the table end index of the first table. Any number of tables can be nested within one another. By comparing table start and table end indices stored in the performance cache 900, the application 106 can quickly determine whether the document contains any nested tables, and if so, the locations of any such nested tables.

The partial element cache 950 stores information about nested tables in a similar fashion as it stores information about non-nested tables. If the partial element cache 950 contains a nested table, the table contents entry 954 will contain multiple table start markers. Until the number of table start markers equals the number of table end markers, the application 106 will maintain the partial nested table in the partial element cache 950, even if table end markers have been received corresponding to some but not all of the table start markers in the table contents entry 954. By storing a performance cache 900 and a partial element cache 950, the application 106 can quickly determine whether a received mutation is located within a structural element such as a table.

Figure 10:
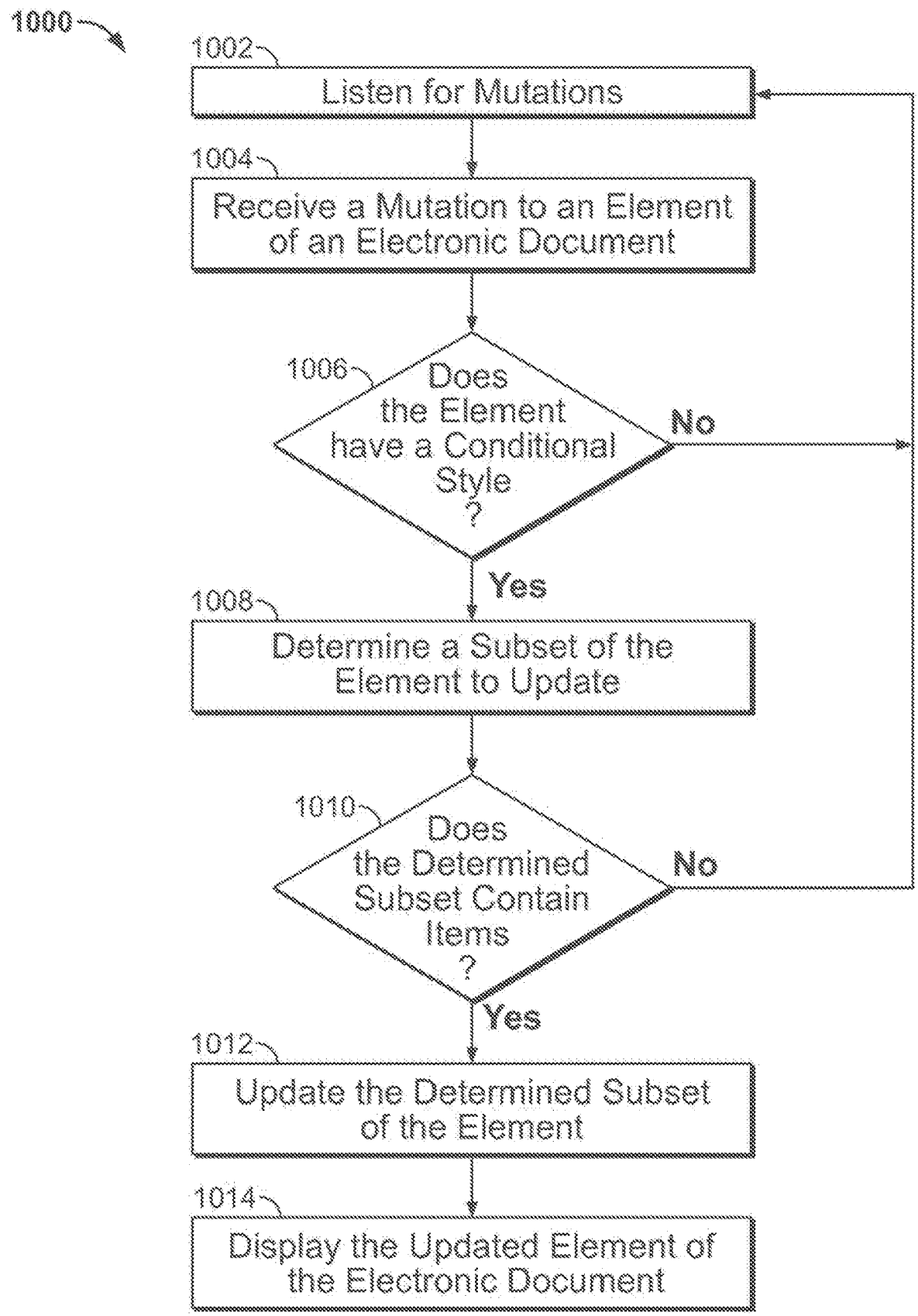
FIG. 10 is a flow chart of a method used to update a subset of an element of an electronic document upon receiving a mutation to the element, according to an illustrative implementation.

FIG. 10 is a flow chart of a method 1000 used to update a subset of an element of an electronic document upon receiving a mutation to the element. At 1002, the controller module 112 listens for mutations to the electronic document. The controller module 112 may listen by communicating with the user interface 118. At 1004, a mutation to an element of the electronic document is received. The controller module 112 can receive this mutation from the user interface module 118. At 1006, the style updater 132 determines whether the element has a conditional style. The style updater 132 can make this determination by searching the set of records 300a for entries into the category 302 matching properties of the element. If the element does not have a conditional style, the method returns to 1002 to listen for further mutations.

If, at 1006, the style updater 132 determines that the element has a conditional style, the method proceeds to 1008. At 1008, a subset of the element to update is determined. Determining a subset of the element to update can include searching the set of records 300 for entries meeting appropriate criteria in the categories 302, 304, 306, and 308. Determining a subset of the element to update can further include determining that the subset is an empty subset and in fact should not be updated. This determination not to update may be performed to improve performance based on the type of user device. In some examples, the subset of the element to update is determined as described with respect to FIG. 10.

At 1010, the style updater 132 determines whether the determined subset contains items. If the determined subset is empty and does not contain items, the method returns to step 1002 to listen for further mutations. If, at 1010, the style updater 132 determines that the determined subset does contain items, the method 1000 proceeds to 1012.

At 1012, the element of the electronic document is updated by updating properties of items in the determined subset as described with respect to FIGS. 4-8. Since the style updater 132 only updates the determined subset and not the entire element, the style updater 132 improves the performance of the application 106.

At 1014, the updated element is displayed. The view module 110 can display the updated element via the interface 118.

Figure 11:
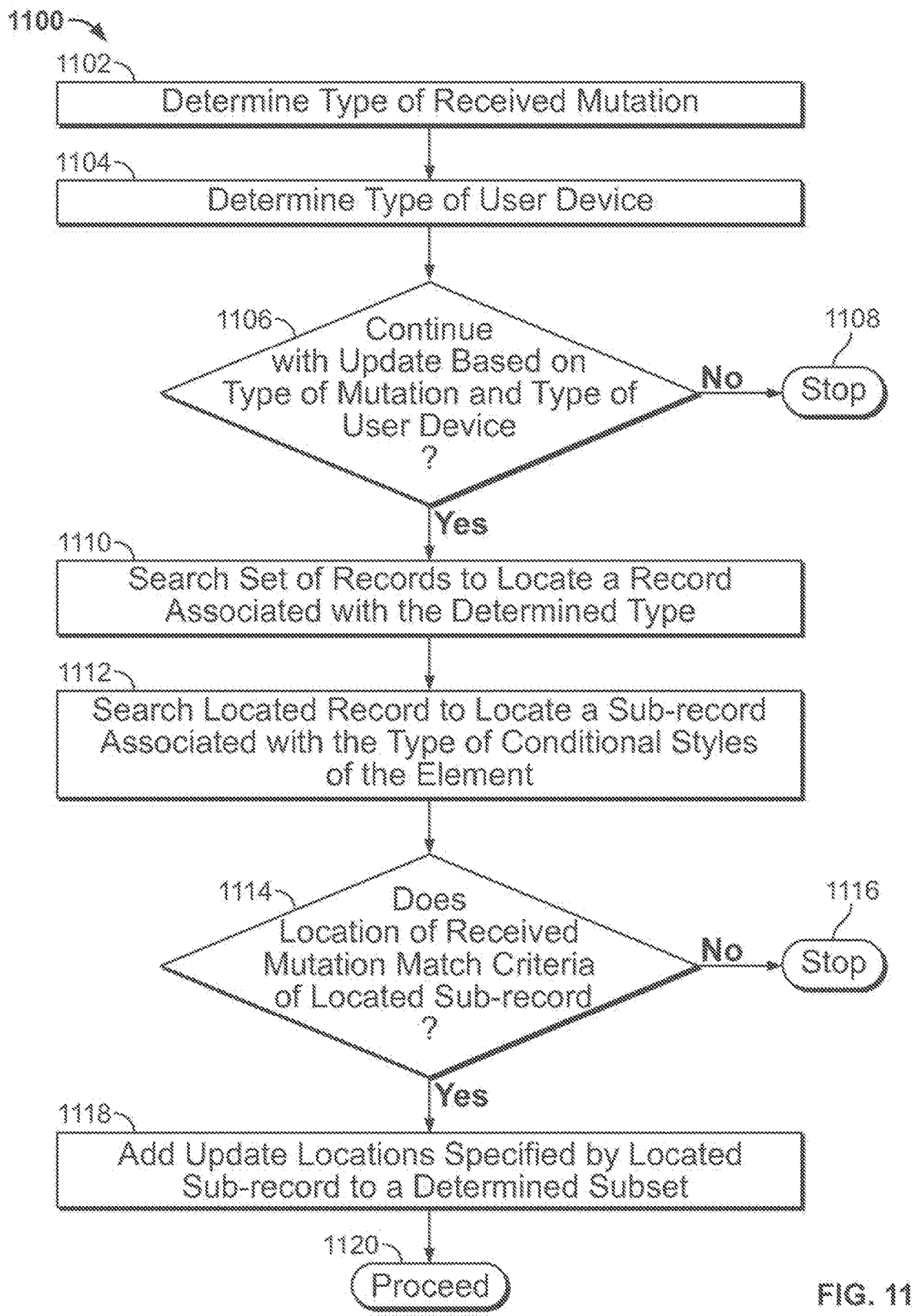
FIG. 11 depicts a flowchart of a method used to determine a subset of an element to update, according to an illustrative implementation.

FIG. 11 depicts a flowchart of a method 1100 used to determine a subset of an element to update. The method 1100 can be used to implement step 1008 of the method 1000. At 1102, the type of received mutation is determined. The style updater 132 can make this determination by determining whether the received mutation is a structural modification to an element of the electronic document.

At 1104, the type of user device is determined. The style updater 132 may make this determination by checking a registry, an operating system, a database, or other methods known in the art.

At decision block 1106, the style updater 132 determines whether to continue with the update based on the determined type of user device. The style updater 132 may be configured to not perform updates for certain types of user devices to improve speed and usability on these devices. For example, users of mobile devices with stringent power consumption requirements and small screen sizes may not benefit from frequent updates of some types of conditional styles. Accordingly, the style updater 132 may be configured not to perform updates for certain types of conditional styles for documents displayed on certain types of user devices. Determining whether to continue with the update at decision block 1106 may thus include determining whether one or more of the type of received mutation, types of conditional styles present in the element, and the location of the received mutation satisfy one or more criteria for continuing with the update.

If, at decision block 1106, the style updater 132 determines not to continue with the update, the method 1100 proceeds to step 1108. At step 1108, the method 1100 terminates.

If, at decision block 1106, the style updater 132 determines to continue with the update, the method 1100 proceeds to step 1110. At 1110, a set of records is searched to locate a record associated with the determined type. The style updater 132 can search the set of record 300 to determine whether the determined type is associated with an entry in the category 302 of a record in the set of records 300. Once a record associated with the determined type is located, the method proceeds to 1112.

At 1112, the located record is searched to locate a sub-record associated with a type of conditional style of the element. The style updater 132 can search the located record to determine whether an entry in the category 304 of the located record is associated with a type of conditional style of the element. After locating a sub-record, the method 1100 proceeds to decision block 1114.

At decision block 1114, the style updater 132 determines whether the location of the received mutation matches one or more criteria of the located sub-record. The style updater 132 can determine whether an entry of the sub-record in the category 306 is associated with the location of the received mutation. If the location of the received mutation does not match criteria of the located sub-record, the method 1100 proceeds to step 1116, where the method 1100 terminates.

If, at decision block 1114, the style updater 132 determines that the location of the received mutation matches one or more criteria of the located sub-record, the method 1100 proceeds to step 1118. At 1118, update locations specified by the located sub-record are added to a determined subset. The determined subset may be stored in memory as a variable, an array, or other data structure.

At step 1120, the method 1100 terminates and the style updater 132 proceeds with updating. In some examples, after step 1120, the style updater may proceed to follow the steps of the method 1000 beginning at step 1012. By dynamically determining whether to update based on the type of user device displaying the electronic document, the method 1100 can optimize editing performance for the type of user device.

Figure 12:
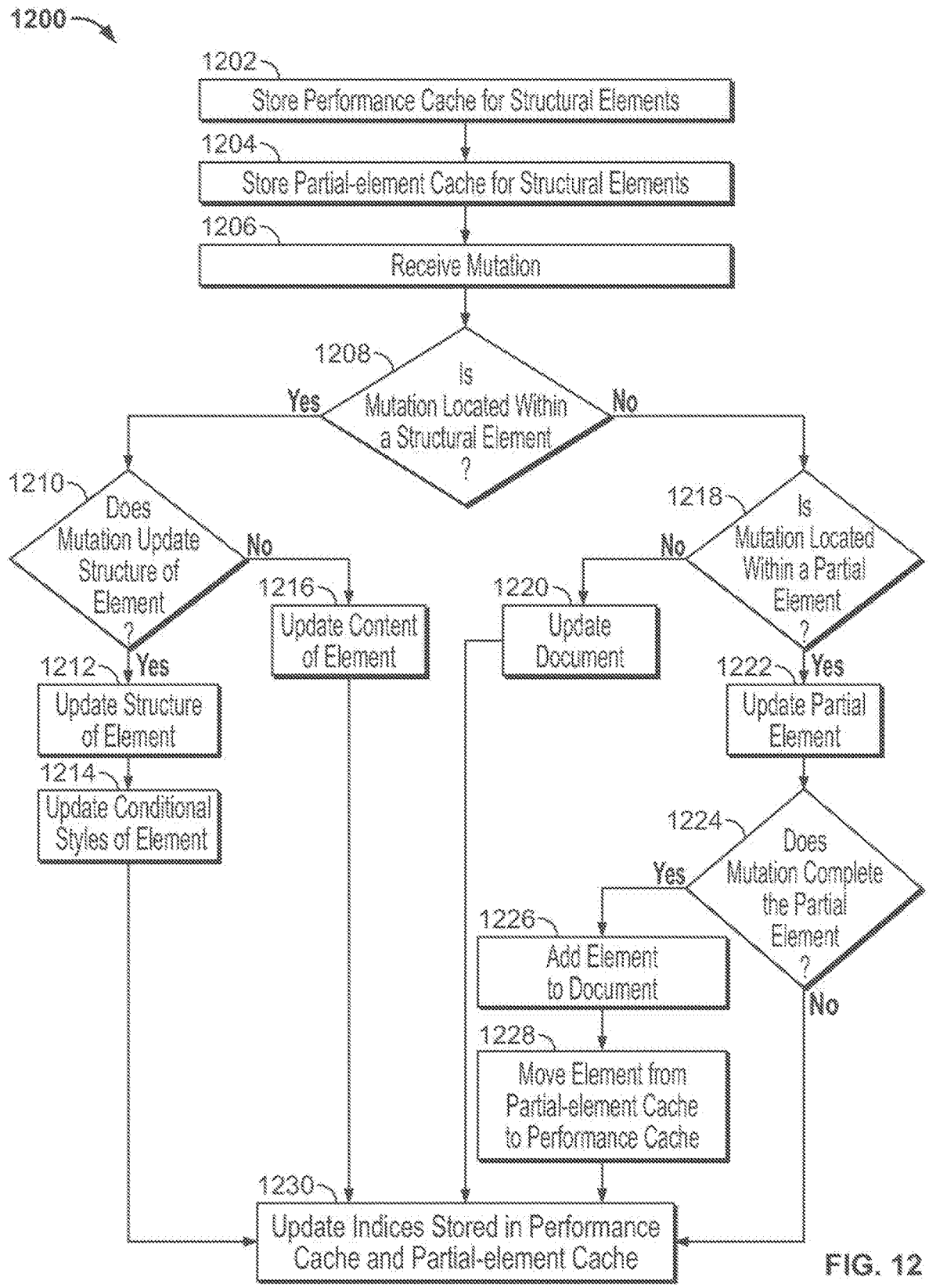
FIG. 12 depicts a flow chart of a method used to determine whether a received mutation to an electronic document is a mutation to a structural element, according to an illustrative implementation.

FIG. 12 is a flow chart of a method 1200 to determine whether a received mutation to an electronic document is a mutation to a structural element such as a table. At 1202, a performance cache for structural elements in the electronic documents is stored. At 1204, a partial element cache for structural elements of the electronic document is stored. The application 106 can perform the storing in steps 1202 and 1204. The cache may be stored in a memory or database of the user device 102.

At 1206, a mutation to the electronic document is received. The application 106 may receive this mutation from a user via the user interface 118. At decision block 1208, the application 106 determines whether the received mutation is located within a structural element of the electronic document. The application 106 can make this determination by comparing a location index of the received mutation with start and end indices of structural elements stored in the performance cache 900. If the location index of the received mutation falls between start and end indices of a structural element in the performance cache 900, the application 106 determines that the mutation is located within a structural element, and the method 1200 proceeds to step 1210.

At step 1210, the application 106 determines whether the received mutation updates the structure of the element in which the mutation is located. The application 106 can make this determination by searching the mutation data for markers indicating structure of the element, such as row start and cell start markers. If the mutation modifies the structure of the element, the method 1200 proceeds to step 1212.

At step 1212, the application 106 updates the structure of the element according to the received mutation.

At step 1214, the application 106 updates conditional styles of the element. The application 106 may update conditional styles of the element according to the systems and methods described with respect to FIGS. 1-7.

If, at step 1210, the application 106 determines that the received mutation does not modify the structure of the element, the method 1200 proceeds to step 1216. At step 1216, the application 106 updates the content of the element without modifying structure according to the received mutation. Updating content without modifying structure may include adding additional text to cell or removing text from a cell.

If, at decision block 1208, the application 106 determines that the received mutation is not located within a structural element, the method 1200 proceeds to decision block 1218. At 1218, the application 106 determines whether the mutation is located within a partial element. The application 106 may determine that the mutation is located within a partial element by determining that the location index of the mutation 980 is greater than a start index of a partial element stored in the partial element cache 950.

If, at decision block 1218, the application 106 determines that the mutation is not located within a partial element, the method 1200 proceeds to step 1220. At step 1220, the application 106 updates the document according to the received mutation.

If, at decision block 1218 the application 106 determine that the mutation is located within a partial element, the method 1200 proceeds to step 1222.

At step 1222, the partial element is updated according to the mutation. Updating the partial element may include adding data from the mutation to the data stored in the partial element cache, such as described with respect to FIG. 9, the mutation 980, and the partial element cache 950. Updating the partial element may also include deleting data from the partial element cache if the received mutation is a deletion.

At decision block 1224, the application 106 determines if the received mutation completes the partial element. Completing the partial element may include balancing the number of element start and element end markers, as described herein with respect to FIG. 9 and the partial element cache 950. If, at decision block 1224, the application 106 determines that the mutation completes the partial element, the application 106 adds the complete element to the document. Adding the element to the document may include adding one or more nodes to a DOM such as the DOM depicted in FIG. 11.

At step 1228, the application 106 moves the completed element from the partial element cache 950 to the performance cache 900. Moving the element into the performance cache 900 may include adding entries to the performance cache 900 corresponding to locations and dimensions of the table.

At step 1230, the application 106 updates indices stored in the performance cache 900 and the partial element cache 950. The application 106 may update only those indices affected by the mutation, such as indices that are greater than the location index of the mutation. Updating indices may include adjusting indices by the number of characters of the mutation data. The application 106 performs step 1230 after each of steps 1214, 1216, 1220, 1228, and decision block 1224. By updating as necessary the indices stored in the performance cache 900 and the partial element cache 950, the application 106 updates the caches to reflect the current state and position of structures referenced by the caches. By keeping the caches current, the application 106 can quickly determine whether a received mutation is located within a structural element such as a table.

Figure 13:
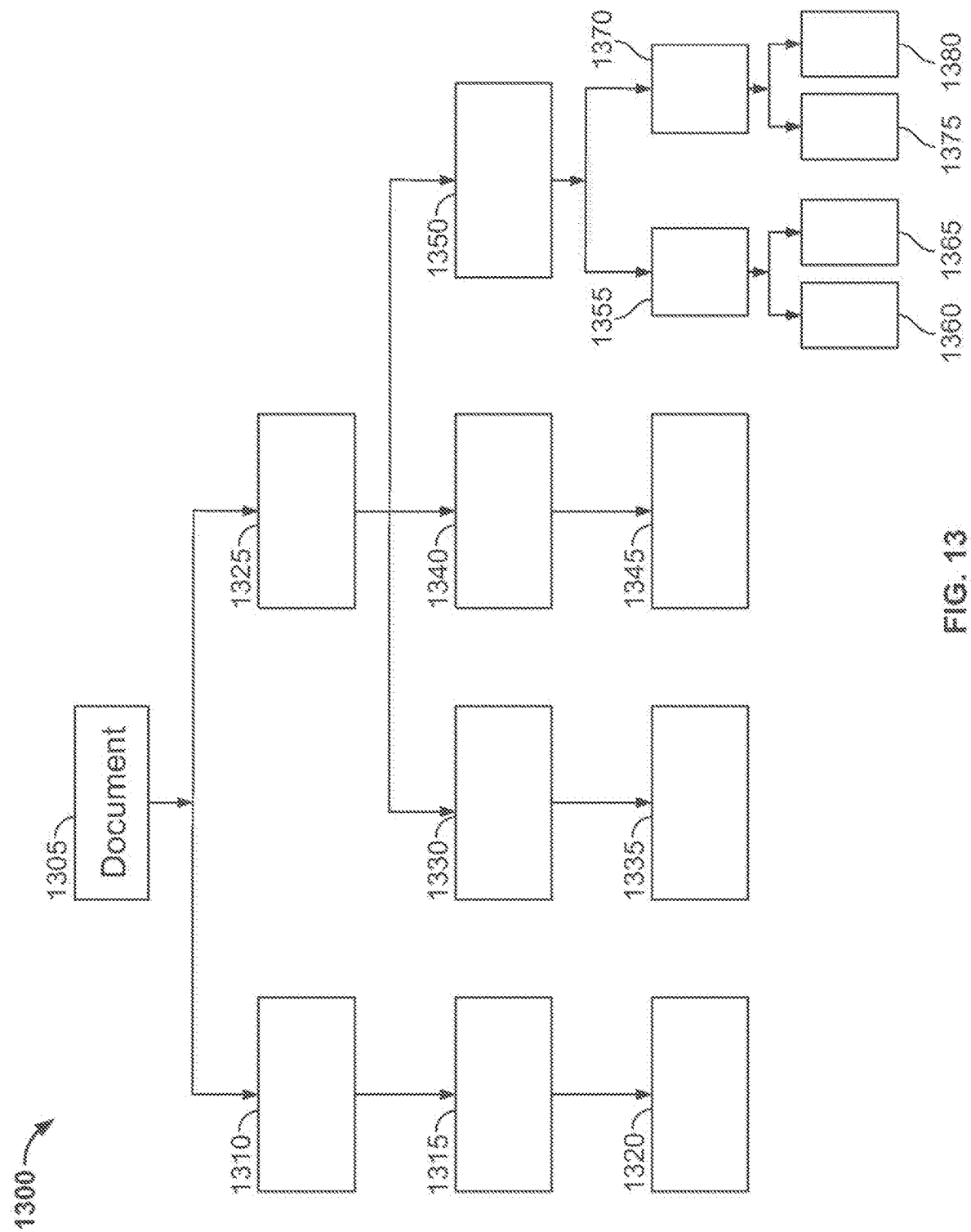
FIG. 13 schematically illustrates a document object model (DOM) used to edit and render a document file, according to an illustrative implementation.

FIG. 13 schematically illustrates a document object model (DOM) 1300 used to edit and render a document file. A document file may refer to a file containing a word processing document, a spreadsheet document, a presentation document, a drawing document, a database document, a HTML document, a XML document, an image document, a text document, or any other document file containing user data. In the DOM 1300, objects of the document 1305 are arranged as nodes in a hierarchy. An object may be a feature of the file. A node may have one or more nodes below it in the hierarchy, and a node may have one or more nodes above it in the hierarchy. For example, node 1315 has node 1320 below it and node 1310 above it. Similar nodes may be at the same level in the hierarchy. For example, nodes 1330, 1340, and 1350 may be at the same level in the hierarchy. In one example, a model-view-controller (MVC) implementation is used to create and edit the DOM 1300, and to display the contents of the DOM 1300 to a user. In this example, the model portion of the MVC parses a file and places sections of the file corresponding to objects of the document 1305 into nodes of the DOM 1300. The MVC implementation may be implemented by the model module 108, the view module 130, and the controller module 132. The MVC implementation may also be implemented by the model module 208, the view module 210, and the controller module 212. The DOM 1300 may be implemented by the model module 108 or the model module 208.

For example, a paragraph may be placed into node 1350 of the DOM 1300, and a sentence in the paragraph may be placed in node 1355. One word of the sentence may be placed into node 1360, and another word may be placed into node 1365. Another sentence of the paragraph may be placed into node 1370, with its words placed in nodes 1375 and 1380. For clarity of illustration, only two sentence nodes and four word nodes are described above and in FIG. 13, but a paragraph may have any number of sentences and corresponding sentence nodes, and a sentence may have any number of words and corresponding word nodes. In another example, a table may be placed into the node 1350 of the DOM 1300, with table row elements placed in nodes 1355 and 1370. The contents of each cell in the table rows may be placed in nodes 1360, 1365, 1375, and 1380, respectively. Tables may have any number of rows and row nodes, and rows may have any number of cell nodes, but two row nodes and four cell nodes are described here for clarity of illustration. In another example, tables may be placed into the DOM 1360 with columns as the primary index. In this example, nodes 1355 and 1370 correspond to columns of the table, and nodes 1360, 1365, 1375, and 1380 correspond to contents of each cell in the table columns. In an example, node 1310 may contain header information of the document. Node 1315 may contain a sentence of the header, and node 1320 may contain a word of the header sentence.

For clarity of illustration, node 1310 has only one subordinate node 1315, which itself has only one subordinate node 1320. Furthermore, as illustrated, the DOM 1300 has four levels of hierarchy. However, any node in a DOM may have any number of subordinate nodes, and a DOM may have any number of levels of hierarchy.

After the model portion creates the DOM 1300 and places contents into nodes, the view portion of a MVC may then traverse node-by-node through the DOM 1300 and render some or all of the objects contained in the nodes of the DOM 1300. The view portion may be a rendering engine and may be implemented by the view module 130 or the view module 210. As the view portion traverses through each node of the DOM 1300, it will render the contents of the node if it is configured to do so. The view portion may use hard-coded logic to decode or parse the contents of each node as it encounters the node while traversing. If the hard-coded logic is configured to decode or parse the contents of the node, the view portion will render the contents of the node for display to a user. If the hard-coded logic is not configured to decode or parse the contents of the node, the view portion will not render the contents of the node and will traverse to another node. In an example, the view portion may traverse through the DOM 1300 concurrently while the model portion is creating or updating the DOM 1300.

The controller portion of a MVC may interact with the view portion and the model portion of the MVC to facilitate editing of the document 1305 represented by the DOM 1300. The controller portion may be implemented by the controller module 112 or the controller module 212. When a user provides an editing input, the controller receives the input, determines the node of the DOM 1300 to which the input corresponds, and updates the corresponding node. The controller then instructs the view portion of the MVC to render the updated node. The update to the DOM 1300 must be validated for correctness. This validation may occur before or after the view portion renders the updated node. In an example, the controller may perform optimistic updating of the DOM 1300. In this example, the controller portion sends the update directly to the view portion for immediate rendering, and asynchronously updates and validates the DOM 1300. If the validation is successful, no further action is taken with regards to the update. If the validation is unsuccessful, the update to the DOM 1300 is reversed, and the view portion renders the DOM 1300 as it existed prior to the update. Such optimistic updating provides faster displaying of user edits. By classifying features of the document 1305 in a hierarchical structure, the view and controller portions can efficiently interact with the DOM 1300 to display and edit the document 1305.

Figure 14:
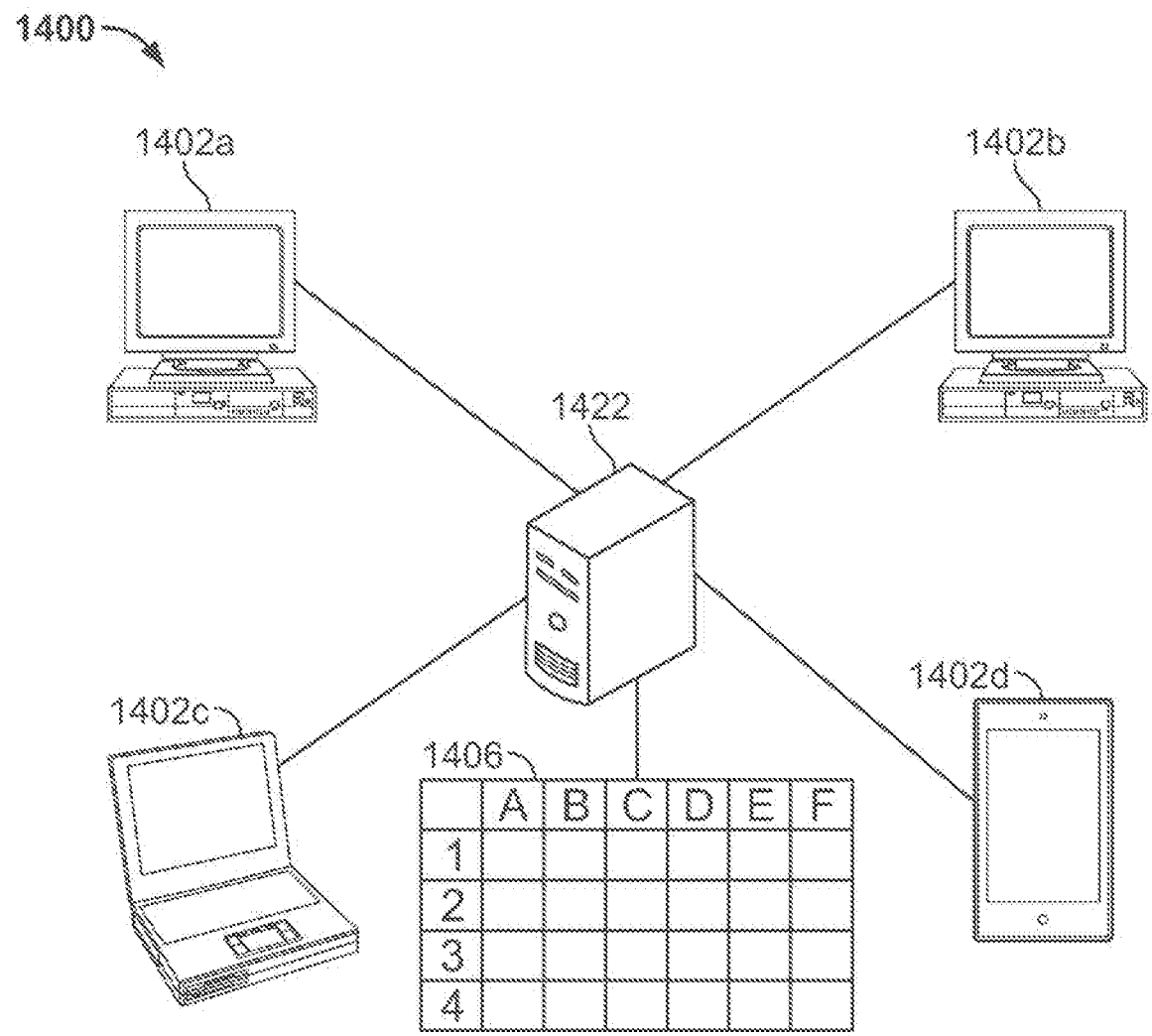
FIG. 14 is a block diagram of a cloud computing service, according to an illustrative implementation.

FIG. 14 shows a client-server system 1400 that includes a cloud computing service 1402 and a number of client devices 1404*a*-1204*d* (generally, client device 1404). The cloud computing service 1402 may be implemented on the server 222. The client devices 1404 may be either or both of the user devices 102 and 202. The cloud computing service 1402 provides cloud computing services for the set of client devices 1404. In particular, the cloud computing service 1402 may include one or more servers that store a number of files accessible by the client devices 1404*a*-1204*d*, such as an exemplary collaborative spreadsheet 1406. Users at the client devices 1404 may create, edit, copy, share, and delete files stored on the cloud computing service 1402. For example, the client devices 1404 may each use a web browser to simultaneously access the spreadsheet 1406 on the cloud computing service 1402. The cloud computing service 1402 provides each client device 1404 with a local copy of the spreadsheet 1406, which users on the client devices 1404 may then view and edit. The cloud computing service 1402 may synchronize the local copies of the spreadsheet 1406 with one another and with a copy of the spreadsheet 1406 that is stored on a server in the cloud computing service 1402. In one example, edits, which may be referred to herein as changes, that are made by the client device 1404*a* are automatically sent to the cloud computing service 1402 and transmitted to the other client devices 1404*b*, 1404*c*, and 1404*d*. In this manner, changes made by one collaborator may be immediately seen by other collaborators.

As used herein, a file includes a set of digitally encoded bits stored on a storage medium. A cloud file includes a file that is stored on a server and accessible via a network. A local file includes a file stored on a user's local device. A client device includes a local device that communicates with a server in a client-server relationship. As used herein, a client device is synonymous with a user device and a local device, unless indicated otherwise by context. As used herein, a document can be associated with multiple files. For example, a cloud file may be a copy of a document stored on a server, and a local file may be a copy of the same document stored on a local device. Generally, multiple copies of the same document may be identical, but they may differ if changes made by one collaborator have not yet been transmitted to other collaborators. This situation may occur when the network connection is slow or intermittent. Multiple copies of the same document may also differ slightly if the copies are stored on disparate types of devices, such as devices with different operating systems. In this case, different copies may have slightly different metadata, or may be encoded differently. For example, one copy may be encoded in a format in which the first bit in a byte contains the most significant bit, and another copy may be encoded in a format in which the first bit in a byte contains the least significant bit. These format differences can exist across multiple files that are copies of the same document, as long as the substance of the information that is displayed to the user is the same across the copies. A local device may read the contents of a file (stored in nonvolatile memory) and store a model representing the file in working memory. The working memory may be volatile (e.g. RAM or an equivalent).

The client devices 1404 may include any combination of desktop computers, laptop computers, tablets, smart phones, mobile electronic devices, or any other device that may connect to the cloud computing service 1402 through a network. Only four client devices 1404 are shown in system 1400, but it should be understood that any number of client devices 1404 of any type may be configured to communicate with the cloud computing service 1402. The cloud computing service 1402 and the client devices 1404 of the system 1400 may be connected through a remote network, such as the Internet. The network connection may be facilitated through a local area network, wide area network, Ethernet, fiber optic network, wireless network, cellular network, interactive television network, telephone network, wireless data transmission system, two-way cable system, customized private or public computer network, interactive kiosk network, direct link, satellite network, and or any other wired or wireless connection.

Figure 15:
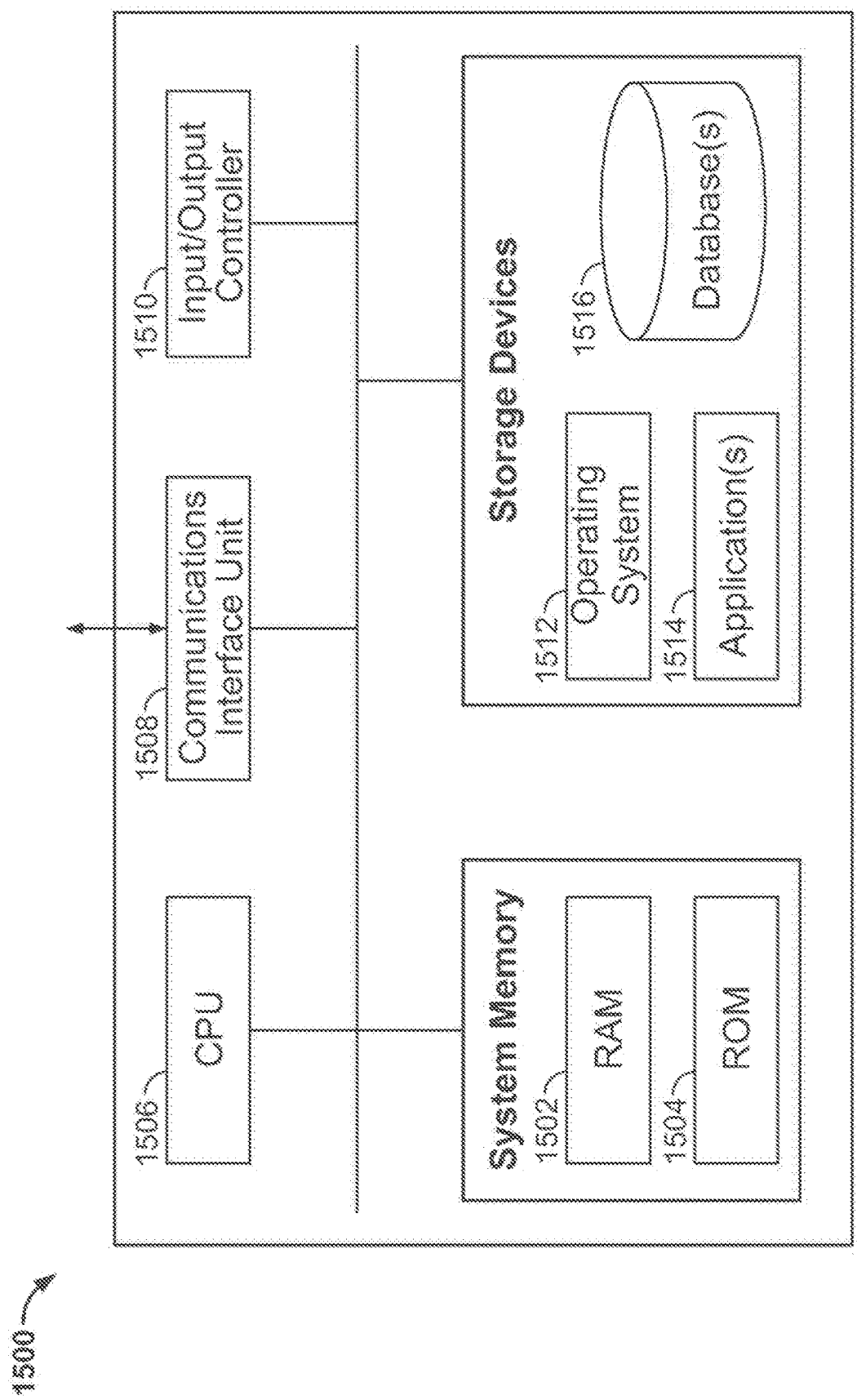
FIG. 15 is a block diagram of a computing device for performing any of the processes described herein, according to an illustrative implementation.

FIG. 15 is a block diagram of a computing device, such as any of the components of the systems of FIGS. 1-14, for performing any of the processes described herein. Each of the components of these systems may be implemented on one or more computing devices 1500. In certain aspects, a plurality of the components of these systems may be included within one computing device 1500. In certain implementations, a component and a storage device may be implemented across several computing devices 1500.

The computing device 1500 includes at least one communications interface unit, an input/output controller 1510, system memory, and one or more data storage devices. The system memory includes at least one random access memory (RAM 1502) and at least one read-only memory (ROM 1504). All of these elements are in communication with a central processing unit (CPU 1506) to facilitate the operation of the computing device 1500. The computing device 1500 may be configured in many different ways. For example, the computing device 1500 may be a conventional standalone computer or alternatively, the functions of computing device 1500 may be distributed across multiple computer systems and architectures. Alternatively, a computer system may be virtualized to provide the functions of multiple computing devices 1500. In FIG. 15, the computing device 1500 is linked, via network or local network, to other servers or systems.

The computing device 1500 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1508 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1506 includes a processor, such as one or more conventional microprocessors and one or more supplementary co-processors such as math co-processors for offloading workload from the CPU 1506. The CPU 1506 is in communication with the communications interface unit 1508 and the input/output controller 1510, through which the CPU 1506 communicates with other devices such as other servers, user terminals, or devices. The communications interface unit 1508 and the input/output controller 1510 may include multiple communication channels for simultaneous communication with, for example, other processors, servers or client terminals.

The CPU 1506 is also in communication with the data storage device. The data storage device may include an appropriate combination of magnetic, optical or semiconductor memory, and may include, for example, RAM 1502, ROM 1504, flash drive, an optical disc such as a compact disc or a hard disk or drive. The CPU 1506 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1506 may be connected to the data storage device via the communications interface unit 1508. The CPU 1506 may be configured to perform one or more particular processing functions.

The data storage device may store, for example, (i) an operating system 1512 for the computing device 1500; (ii) one or more applications 1514 (e.g., computer program code or a computer program product) adapted to direct the CPU 1506 in accordance with the systems and methods described here, and particularly in accordance with the processes described in detail with regard to the CPU 1506; or (iii) database(s) 1516 adapted to store information that may be utilized to store information required by the program.

The operating system 1512 and applications 1514 may be stored, for example, in a compressed, an uncompiled and an encrypted format, and may include computer program code. The instructions of the program may be read into a main memory of the processor from a computer-readable medium other than the data storage device, such as from the ROM 1504 or from the RAM 1502. While execution of sequences of instructions in the program causes the CPU 1506 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 1512, a database management system and "device drivers" that allow the processor to interface with computer peripheral devices (e.g., a video display, a keyboard, a computer mouse, etc.) via the input/output controller 1510.

The term "computer-readable medium" as used herein refers to any non-transitory medium that provides or participates in providing instructions to the processor of the computing device 1500 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1506 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1500 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A computer-implemented method for updating a stylized sub-element in an electronic document, the method comprising:
   determining, by a processor and without any user input, a plurality of indices corresponding to locations within the electronic document of a plurality of portions of the stylized sub-element, wherein the stylized sub-element is associated with one or more styles for the plurality of portions of the stylized sub-element;
   storing, by the processor and without any user input, the plurality of indices corresponding to the locations within the electronic document of the plurality of portions of the stylized sub-element, wherein the plurality of indices is stored in addition to data defining the electronic document;
   receiving, by the processor, a mutation to the electronic document;
   responsive to receiving the mutation, determining, by the processor and without any user input, that the mutation pertains to a style of the stylized sub-element, and that a type of the mutation pertains to one or more portions of the plurality of portions of the stylized sub-element, wherein the one or more portions of the plurality of portions of the stylized sub-element are each associated with a conditional style that depends on a location of a respective portion of the stylized sub-element within the electronic document;
   adjusting, in a cache, the plurality of indices based on size of mutation data associated with the mutation;
   automatically updating, by the processor and based on the mutation and the plurality of indices corresponding to the locations of the plurality of portions of the stylized sub-element within the electronic document, the stylized sub-element; and
   causing, by the processor, the one or more portions of the updated stylized sub-element to be displayed in a user interface at a user device using a different style.

2. The method of claim 1, wherein determining that the mutation pertains to the style of the stylized sub-element comprises determining that a location index of the mutation is between a start index of the plurality of indices and an end index of the plurality of indices.

3. The method of claim 2, wherein:
   determining that the mutation pertains to the style of the stylized sub-element further comprises determining that the mutation contains a marker of a structural feature of the stylized sub-element; and
   the method further comprises updating the plurality of indices to include an additional index corresponding to a location of the marker within the electronic document.

4. The method of claim 1, further comprising:
   storing, in a data store, a partial index corresponding to a location within the electronic document of a partial stylized sub-element;
   storing, in the data store, a text string containing the partial stylized sub-element;
   receiving, at the processor, a second mutation to the electronic document;
   determining, based on the partial index, that the second mutation modifies the partial stylized sub-element; and
   modifying, by the processor, the text string based on the second mutation.

5. The method of claim 4, further comprising:
  determining, by the processor, that the second mutation completes the partial stylized sub-element to result in a completed stylized sub-element;
  modifying, by the processor, the plurality of indices to include additional indices corresponding to locations within the electronic document of portions of the completed stylized sub-element;
  updating, by the processor, the electronic document to include the completed stylized sub-element; and
  displaying the updated electronic document at the user device.

6. The method of claim 1, further comprising:
  receiving, at the processor, a third mutation to the electronic document;
  determining, by the processor, that the third mutation modifies the stylized sub-element in the electronic document to result in a partial stylized sub-element;
  storing, in a data store, a partial index corresponding to a location within the electronic document of the partial stylized sub-element;
  storing, in the data store, a text string containing the partial stylized sub-element;
  updating the plurality of indices to remove indices corresponding to locations within the electronic document of portions of the stylized sub-element;
  updating the electronic document to remove the stylized sub-element; and
  displaying the updated electronic document at the user device.

7. The method of claim 1, further comprising determining the plurality of indices based on a one-dimensional text string containing the electronic document.

8. The method of claim 1, further comprising:
  receiving, at the processor, a second mutation to the electronic document;
  determining, by the processor, that the second mutation does not modify the stylized sub-element;
  updating the plurality of indices based on the second mutation;
  updating the electronic document based on the second mutation; and
  displaying the updated electronic document at the user device.

9. The method of claim 8, wherein determining that the second mutation does not modify the stylized sub-element comprises determining that a location index of the second mutation is not between a start index of the plurality of indices and an end index of the plurality of indices.

10. The method of claim 1, wherein the plurality of indices is stored in a cache that is separate from the data defining the electronic document.

11. A system to update a stylized sub-element in an electronic document, the system comprising:
  a memory; and
  a processor, coupled to the memory, to perform operations comprising:
    determining, without any user input, a plurality of indices corresponding to locations within the electronic document of a plurality of portions of the stylized sub-element, wherein the stylized sub-element is associated with one or more styles for the plurality of portions of the stylized sub-element;
    storing, without any user input, the plurality of indices corresponding to the locations within the electronic document of the plurality of portions of the stylized sub-element, wherein the plurality of indices is stored in addition to data defining the electronic document;
    receiving a mutation to the electronic document;
    responsive to receiving the mutation, determining, without any user input, that the mutation pertains to a style of the stylized sub-element, and that a type of the mutation pertains to one or more portions of the plurality of portions of the stylized sub-element, wherein the one or more portions of the plurality of portions of the stylized sub-element are each associated with a conditional style that depends on a location of a respective portion of the stylized sub-element within the electronic document;
    adjusting, in a cache, the plurality of indices based on size of mutation data associated with the mutation;
    automatically updating, based on the mutation and the plurality of indices corresponding to the locations of the plurality of portions of the stylized sub-element within the electronic document, the stylized sub-element; and
    causing the one or more portions of the updated stylized sub-element to be displayed in a user interface at a user device using a different style.

12. The system of claim 11, wherein determining that the mutation pertains to the style of the stylized sub-element comprises determining that a location index of the mutation is between a start index of the plurality of indices and an end index of the plurality of indices.

13. The system of claim 12, wherein:
  determining that the mutation pertains to the style of the stylized sub-element further comprises determining that the mutation contains a marker of a structural feature of the stylized sub-element; and
  the operations further comprise updating the plurality of indices to include an additional index corresponding to a location of the marker within the electronic document.

14. The system of claim 11, wherein the operations further comprise:
  storing, in a data store, a partial index corresponding to a location within the electronic document of a partial stylized sub-element;
  storing, in the data store, a text string containing the partial stylized sub-element;
  receiving a second mutation to the electronic document;
  determining, based on the partial index, that the second mutation modifies the partial stylized sub-element; and
  modifying the text string based on the second mutation.

15. The system of claim 14, wherein the operations further comprise:
  determining that the second mutation completes the partial stylized sub-element to result in a completed stylized sub-element;
  modifying the plurality of indices to include additional indices corresponding to locations within the electronic document of portions of the completed stylized sub-element;
  updating the electronic document to include the completed stylized sub-element; and
  displaying the updated electronic document at the user device.

16. The system of claim 11, wherein the operations further comprise:
  receiving a third mutation to the electronic document;
  determining that the third mutation modifies the stylized sub-element in the electronic document to result in a partial stylized sub-element;

storing, in a data store, a partial index corresponding to a location within the electronic document of the partial stylized sub-element;

storing, in the data store, a text string containing the partial stylized sub-element;

updating the plurality of indices to remove indices corresponding to locations within the electronic document of portions of the stylized sub-element;

updating the electronic document to remove the stylized sub-element; and displaying the updated electronic document at the user device.

17. A non-transitory computer-readable medium comprising instructions to cause a processor to perform operations to update a stylized sub-element in an electronic document, the operations comprising:

determining, without any user input, a plurality of indices corresponding to locations within the electronic document of a plurality of portions of the stylized sub-element, wherein the stylized sub-element is associated with one or more styles for the plurality of portions of the stylized sub-element;

storing, without any user input, the plurality of indices corresponding to the locations within the electronic document of the plurality of portions of the stylized sub-element, wherein the plurality of indices is stored in addition to data defining the electronic document;

receiving a mutation to the electronic document;

responsive to receiving the mutation, determining, without any user input, that the mutation pertains to a style of the stylized sub-element, and that a type of the mutation pertains to one or more portions of the plurality of portions of the stylized sub-element, wherein the one or more portions of the plurality of portions of the stylized sub-element are each associated with a conditional style that depends on a location of a respective portion of the stylized sub-element within the electronic document;

adjusting, in a cache, the plurality of indices based on size of mutation data associated with the mutation;

automatically updating, based on the mutation and the plurality of indices corresponding to the locations of the plurality of portions of the stylized sub-element within the electronic document, the stylized sub-element; and causing the one or more portions of the updated stylized sub-element to be displayed in a user interface at a user device using a different style.

18. The non-transitory computer-readable medium of claim 17, wherein determining that the mutation pertains to the style of the stylized sub-element comprises determining that a location index of the mutation is between a start index of the plurality of indices and an end index of the plurality of indices.

19. The non-transitory computer-readable medium of claim 18, wherein:

determining that the mutation pertains to the style of the stylized sub-element further comprises determining that the mutation contains a marker of a structural feature of the stylized sub-element; and the operations further comprise updating the plurality of indices to include an additional index corresponding to a location of the marker within the electronic document.

* * * * *